United States Patent
Yang et al.

(10) Patent No.: US 12,480,706 B2
(45) Date of Patent: Nov. 25, 2025

(54) REFRIGERATOR

(71) Applicant: HISENSE REFRIGERATOR CO., LTD., Shandong (CN)

(72) Inventors: Chun Yang, Shandong (CN); Yufeng Bao, Shandong (CN); Xiangping Zhang, Shandong (CN); Haiyan Wang, Shandong (CN); Dong Guo, Shandong (CN)

(73) Assignee: HISENSE REFRIGERATOR CO., LTD., Qingdao (CN)

( * ) Notice: Subject to any disclaimer, the term of this patent is extended or adjusted under 35 U.S.C. 154(b) by 79 days.

(21) Appl. No.: 18/423,016

(22) Filed: Jan. 25, 2024

(65) Prior Publication Data

US 2024/0167756 A1    May 23, 2024

Related U.S. Application Data

(63) Continuation of application No. PCT/CN2021/118612, filed on Sep. 15, 2021.

(30) Foreign Application Priority Data

Jul. 26, 2021  (CN) .......................... 202110844775.7
Jul. 26, 2021  (CN) .......................... 202110844802.0
Jul. 26, 2021  (CN) .......................... 202110846078.5

(51) Int. Cl.
*F25D 23/02*    (2006.01)
*E05D 3/18*     (2006.01)
*F25D 23/06*    (2006.01)

(52) U.S. Cl.
CPC ............ *F25D 23/028* (2013.01); *E05D 3/18* (2013.01); *F25D 23/063* (2013.01); *E05Y 2900/31* (2013.01)

(58) Field of Classification Search
CPC ................ F25D 23/028; F25D 23/063; F25D 2323/024; E05D 3/06; E05D 3/18; E05Y 2900/31

(Continued)

(56) References Cited

U.S. PATENT DOCUMENTS 2,793,387 A * 5/1957 Odell ........................ E05D 3/18
                                                         16/358
3,065,498 A * 11/1962 Johnson .................... E05D 3/18
                                                         16/359

(Continued)

FOREIGN PATENT DOCUMENTS

CN    101501288 A    8/2009
CN    104295174 A    1/2015

(Continued)

OTHER PUBLICATIONS

Chinese Notification of the Second Office Action dated Apr. 11, 2024 in corresponding Chinese Application No. 202210756591.X, translated, 18 pages.

(Continued)

*Primary Examiner* — James O Hansen
(74) *Attorney, Agent, or Firm* — MH2 TECHNOLOGY LAW GROUP LLP

(57) ABSTRACT

A refrigerator includes a refrigerator body and a door body. In a case where the door body is opened from a closed state to a first state, a first hinge shaft moves from a first positioning position to a second positioning position along a first positioning trajectory line with respect to a first trajectory slot, and a second hinge shaft moves from a first guiding position to a second guiding position along a first guiding trajectory line with respect to a second trajectory slot. In a case where the door body continues to be opened from the first state to a second state, the first hinge shaft moves from the second positioning position to a third positioning posi- (Continued)

tion along a second positioning trajectory line, the second hinge shaft moves from the second guiding position to a third guiding position along a second guiding trajectory line.

20 Claims, 15 Drawing Sheets

(58) Field of Classification Search
USPC .......................................................... 312/405
See application file for complete search history.

(56) References Cited

U.S. PATENT DOCUMENTS

| | | | |
|---|---|---|---|
| 3,083,403 | A | 4/1963 | Van Noord |
| 6,493,906 | B2 * | 12/2002 | Matteau ............... E05D 3/18 |
| | | | 16/358 |
| 8,303,059 | B2 * | 11/2012 | Darney ............... E05D 3/18 |
| | | | 312/405 |
| 2012/0025686 | A1 | 2/2012 | Darney |
| 2019/0186183 | A1 | 6/2019 | He et al. |
| 2020/0141166 | A1 | 5/2020 | Zhang et al. |
| 2022/0259904 | A1 | 8/2022 | Xia et al. |
| 2022/0259907 | A1 | 8/2022 | Xia et al. |
| 2023/0375252 | A1 | 11/2023 | Zhong et al. |
| 2023/0383582 | A1 | 11/2023 | Zhong et al. |

FOREIGN PATENT DOCUMENTS

| | | |
|---|---|---|
| CN | 106196819 A | 12/2016 |
| CN | 106766596 A | 5/2017 |
| CN | 207048541 U | 2/2018 |
| CN | 109470000 A | 3/2019 |
| CN | 109470004 A | 3/2019 |
| CN | 109470018 A | 3/2019 |
| CN | 110220291 A | 9/2019 |
| CN | 111155859 A | 5/2020 |
| CN | 111734244 A | 10/2020 |
| CN | 112282540 A | 1/2021 |
| CN | 112282543 A | 1/2021 |
| CN | 112282547 A | 1/2021 |
| CN | 112282549 A | 1/2021 |
| CN | 112284018 A | 1/2021 |
| CN | 212378331 U | 1/2021 |
| CN | 112304008 A | 2/2021 |
| CN | 112595011 A | 4/2021 |
| CN | 213330533 U | 6/2021 |
| CN | 215632370 U | 1/2022 |
| CN | 215983419 U | 3/2022 |
| CN | 114812073 A | 7/2022 |
| CN | 114812074 A | 7/2022 |
| CN | 114812075 A | 7/2022 |
| CN | 114812076 A | 7/2022 |
| CN | 114812077 A | 7/2022 |
| CN | 114812078 A | 7/2022 |
| CN | 114812079 A | 7/2022 |
| CN | 114812080 A | 7/2022 |
| CN | 114812081 A | 7/2022 |
| CN | 114812082 A | 7/2022 |
| CN | 114877602 A | 8/2022 |
| CN | 114877603 A | 8/2022 |
| CN | 114963662 A | 8/2022 |
| CN | 114963663 A | 8/2022 |
| CN | 114963664 A | 8/2022 |
| CN | 114963665 A | 8/2022 |
| CN | 114963666 A | 8/2022 |
| CN | 114963667 A | 8/2022 |
| CN | 115031477 A | 9/2022 |
| CN | 115143688 A | 10/2022 |
| CN | 115143689 A | 10/2022 |
| CN | 115143690 A | 10/2022 |
| CN | 115143691 A | 10/2022 |
| CN | 115143692 A | 10/2022 |
| CN | 115143693 A | 10/2022 |
| CN | 115143694 A | 10/2022 |
| CN | 115143695 A | 10/2022 |
| CN | 115143696 A | 10/2022 |
| CN | 115143697 A | 10/2022 |
| CN | 115143698 A | 10/2022 |
| CN | 115143699 A | 10/2022 |
| CN | 115143700 A | 10/2022 |
| CN | 115143701 A | 10/2022 |
| CN | 115143702 A | 10/2022 |
| CN | 115143703 A | 10/2022 |
| CN | 115143704 A | 10/2022 |
| CN | 115143705 A | 10/2022 |
| CN | 115143706 A | 10/2022 |
| CN | 115200304 A | 10/2022 |
| CN | 115289754 A | 11/2022 |
| CN | 115289755 A | 11/2022 |
| CN | 115289756 A | 11/2022 |
| CN | 115289757 A | 11/2022 |
| CN | 115289758 A | 11/2022 |
| CN | 115307361 A | 11/2022 |
| CN | 115307362 A | 11/2022 |
| CN | 115307363 A | 11/2022 |
| CN | 115307364 A | 11/2022 |
| CN | 115307365 A | 11/2022 |
| CN | 115307366 A | 11/2022 |
| CN | 115307367 A | 11/2022 |
| CN | 115307368 A | 11/2022 |
| CN | 115523710 A | 12/2022 |
| CN | 115615099 A | 1/2023 |
| CN | 115615100 A | 1/2023 |
| CN | 115680403 A | 2/2023 |
| CN | 115680404 A | 2/2023 |
| CN | 115680408 A | 2/2023 |
| CN | 115680409 A | 2/2023 |
| CN | 115680411 A | 2/2023 |
| CN | 115682514 A | 2/2023 |
| CN | 115682515 A | 2/2023 |
| CN | 115682516 A | 2/2023 |
| CN | 115682517 A | 2/2023 |
| CN | 115682518 A | 2/2023 |
| CN | 115682519 A | 2/2023 |
| CN | 115682520 A | 2/2023 |
| CN | 115682521 A | 2/2023 |
| CN | 115682522 A | 2/2023 |
| CN | 115682523 A | 2/2023 |
| CN | 115682524 A | 2/2023 |
| CN | 115682561 A | 2/2023 |
| CN | 115682594 A | 2/2023 |
| CN | 115682595 A | 2/2023 |
| CN | 115682596 A | 2/2023 |
| CN | 115682597 A | 2/2023 |
| CN | 115682598 A | 2/2023 |
| CN | 115682599 A | 2/2023 |
| CN | 115682600 A | 2/2023 |
| CN | 115682601 A | 2/2023 |
| CN | 115682602 A | 2/2023 |
| CN | 115682603 A | 2/2023 |
| CN | 115682604 A | 2/2023 |
| CN | 115682605 A | 2/2023 |
| CN | 115823798 A | 3/2023 |
| CN | 115823803 A | 3/2023 |
| CN | 115839568 A | 3/2023 |
| CN | 115839569 A | 3/2023 |
| CN | 115839570 A | 3/2023 |
| CN | 115839571 A | 3/2023 |
| CN | 115839572 A | 3/2023 |
| CN | 115839573 A | 3/2023 |
| CN | 115839580 A | 3/2023 |
| CN | 115839581 A | 3/2023 |
| CN | 115839582 A | 3/2023 |
| CN | 115839583 A | 3/2023 |
| CN | 115839584 A | 3/2023 |
| CN | 115839585 A | 3/2023 |
| CN | 115839586 A | 3/2023 |
| CN | 115839587 A | 3/2023 |
| CN | 115839588 A | 3/2023 |
| CN | 116358235 A | 6/2023 |
| CN | 116378522 A | 7/2023 |
| CN | 116412594 A | 7/2023 |
| CN | 116412595 A | 7/2023 |

(56) References Cited

FOREIGN PATENT DOCUMENTS

| | | |
|---|---|---|
| CN | 116412596 A | 7/2023 |
| CN | 116412598 A | 7/2023 |
| CN | 116412599 A | 7/2023 |
| CN | 219550952 U | 8/2023 |
| CN | 219589259 U | 8/2023 |
| CN | 219693630 U | 9/2023 |
| CN | 219735700 U | 9/2023 |
| CN | 219735701 U | 9/2023 |
| CN | 219735709 U | 9/2023 |
| CN | 219735710 U | 9/2023 |
| CN | 117804117 A | 4/2024 |
| CN | 117804134 A | 4/2024 |
| CN | 117804135 A | 4/2024 |
| CN | 117804136 A | 4/2024 |
| CN | 117804137 A | 4/2024 |
| CN | 117824269 A | 4/2024 |
| CN | 117847887 A | 4/2024 |
| CN | 117847888 A | 4/2024 |
| CN | 117847898 A | 4/2024 |
| CN | 117847899 A | 4/2024 |
| CN | 117847900 A | 4/2024 |
| CN | 117847901 A | 4/2024 |
| CN | 117847902 A | 4/2024 |
| CN | 117847903 A | 4/2024 |
| CN | 117847904 A | 4/2024 |
| CN | 118009609 A | 5/2024 |
| CN | 118009610 A | 5/2024 |
| CN | 118049788 A | 5/2024 |
| CN | 118049789 A | 5/2024 |
| CN | 118049790 A | 5/2024 |
| CN | 118049791 A | 5/2024 |
| CN | 118049792 A | 5/2024 |
| CN | 118049793 A | 5/2024 |
| CN | 118049794 A | 5/2024 |
| CN | 118049795 A | 5/2024 |
| CN | 118049796 A | 5/2024 |
| CN | 118049797 A | 5/2024 |
| CN | 118049798 A | 5/2024 |
| CN | 118049799 A | 5/2024 |
| CN | 118128385 A | 6/2024 |
| CN | 118128386 A | 6/2024 |
| CN | 118128387 A | 6/2024 |
| CN | 118128388 A | 6/2024 |
| CN | 118128389 A | 6/2024 |
| CN | 118128390 A | 6/2024 |
| CN | 118128391 A | 6/2024 |
| CN | 118128392 A | 6/2024 |
| CN | 118129371 A | 6/2024 |
| CN | 118129372 A | 6/2024 |
| CN | 118129379 A | 6/2024 |
| CN | 118129380 A | 6/2024 |
| CN | 118129381 A | 6/2024 |
| CN | 118129382 A | 6/2024 |
| CN | 118129400 A | 6/2024 |
| CN | 118273605 A | 7/2024 |
| CN | 118273606 A | 7/2024 |
| CN | 118274522 A | 7/2024 |
| CN | 118274523 A | 7/2024 |
| CN | 118274524 A | 7/2024 |
| CN | 118274525 A | 7/2024 |
| CN | 118274561 A | 7/2024 |
| CN | 118274562 A | 7/2024 |
| CN | 118274563 A | 7/2024 |
| CN | 118274564 A | 7/2024 |
| CN | 118274565 A | 7/2024 |
| CN | 118274566 A | 7/2024 |
| CN | 118274567 A | 7/2024 |
| CN | 118274568 A | 7/2024 |
| CN | 118274569 A | 7/2024 |
| CN | 221666382 U | 9/2024 |
| CN | 221705929 U | 9/2024 |
| CN | 221705930 U | 9/2024 |
| CN | 221705931 U | 9/2024 |

OTHER PUBLICATIONS

Chinese Notification of the First Office Action dated Oct. 10, 2023 in corresponding Chinese Application No. 202210464644.0, translated, 15 pages.
Chinese Notification of the First Office Action dated Feb. 1, 2023 in corresponding Chinese Application No. 202210464645.5, translated, 16 pages.
Chinese Notification of the Second Office Action dated May 11, 2023 in corresponding Chinese Application No. 202210464645.5, translated, 15 pages.
Chinese Notification of the First Office Action dated Sep. 26, 2023 in corresponding Chinese Application No. 202210464933.0, translated, 17 pages.
Chinese Notification of the First Office Action dated Sep. 7, 2023 in corresponding Chinese Application No. 202210464947.2, translated, 15 pages.
Chinese Notification of the First Office Action dated Sep. 8, 2023 in corresponding Chinese Application No. 202210756350.5, translated, 15 pages.
Chinese Notification of the First Office Action dated Sep. 23, 2023 in corresponding Chinese Application No. 202210756495.5, translated, 13 pages.
Chinese Notification of the Second Office Action dated Apr. 11, 2024 in corresponding Chinese Application No. 202210756495.5, translated, 15 pages.
Chinese Notification of the First Office Action dated May 7, 2023 in corresponding Chinese Application No. 202210905209.7, translated, 16 pages.
International Search Report and Written Opinion dated Sep. 28, 2022 in corresponding International Application No. PCT/CN2022/101652, translated, 18 pages.
International Search Report and Written Opinion dated Nov. 29, 2022 in corresponding International Application No. PCT/CN2022/118564, translated, 22 pages.
International Search Report and Written Opinion dated Dec. 21, 2022 in corresponding International Application No. PCT/CN2022/119674, translated, 24 pages.
Chinese Notification of the First Office Action dated Aug. 17, 2024 in corresponding Chinese Application No. 202110994578.3, translated, 14 pages.
International Search Report and Written Opinion dated Mar. 14, 2023 in corresponding International Application No. PCT/CN2022/129650, translated, 14 pages.
International Search Report and Written Opinion dated Mar. 28, 2023 in corresponding International Application No. PCT/CN2023/070699, translated, 19 pages.
Chinese Notification of the First Office Action dated Aug. 15, 2023 in corresponding Chinese Application No. 202210388529.X, translated, 19 pages.
Chinese Notification of the First Office Action dated Sep. 15, 2023 in corresponding Chinese Application No. 202210756351.X, translated, 15 pages.

* cited by examiner

REFRIGERATOR

CROSS-REFERENCE TO RELATED APPLICATIONS

This application is a continuation application of International Patent Application No. PCT/CN2021/118612, filed on Sep. 15, 2021, which claims priority to Chinese Patent Application No. 202110844775.7, filed on Jul. 26, 2021; Chinese Patent Application No. 202110846078.5, filed on Jul. 26, 2021; and Chinese Patent Application No. 202110844802.0, filed on Jul. 26, 2021, which are incorporated herein by reference in their entireties.

TECHNICAL FIELD

The present disclosure relates to the technical field of household appliances and, in particular, to a refrigerator.

BACKGROUND

In domesticity, refrigerators have become one of the essential appliances in every family. More and more consumers choose built-in refrigerators due to the demand for indoor beauty and simplicity.

The built-in refrigerator is a refrigerator embedded into a cabinet matching with the refrigerator, and a heat dissipation cycle is formed by feet, a back plate, and a top plate of the refrigerator. Therefore, there may be a small gap between the inner side wall of the cabinet and the left and right side walls of the refrigerator.

SUMMARY

A refrigerator is provided. The refrigerator includes a refrigerator body, a door body, and a cold air supply device. The refrigerator body has a storage chamber. The door body is connected to the refrigerator body to open or close the storage chamber. The cold air supply device supplies cold air to the storage chamber. The refrigerator body includes an inner shell, an outer shell, and an insulator. The inner shell defines the storage chamber. The outer shell is connected to an outside of the inner shell, so as to constitute an appearance of the refrigerator. The insulator is disposed between the inner shell and the outer shell to insulate the storage chamber. The storage chamber has an open front portion for putting in and taking out food, and the door body is rotatably connected to the refrigerator body, so as to open and close the open front portion of the storage chamber. The door body is rotatably supported by a hinge located at an upper end of the door body and a hinge located at a lower end of the door body. The hinge located at the upper end of the door body includes a hinge plate, a first hinge shaft, and a second hinge shaft. The hinge plate is connected to an upper end of the refrigerator body, and the first hinge shaft and the second hinge shaft are connected to the hinge plate to constitute rotation shafts. The hinge plate includes a connecting portion and a first extending portion. The connecting portion is in a shape of a plate extending substantially horizontally and connected to the refrigerator body. The first extending portion extends forward from the connecting portion and is in a shape of a plate extending substantially horizontally. The connecting portion is fixed on the refrigerator body by means of a fastener. In the hinge located at the lower end of the door body, the connecting portion is connected to a front surface of the refrigerator body, and the first hinge shaft and the second hinge shaft extend upwards from the hinge plate. Corresponding to positions of the hinge plates, the upper and lower ends of the door body are each provided with a first trajectory slot and a second trajectory slot. In a case where the hinge plate is located on a right side of the refrigerator body, a right side of the door body is a side wall. In a case where the hinge plate is located on a left side of the refrigerator body, a left side of the door body is the side wall. A front wall and the side wall of the door body meet to constitute a side edge. The refrigerator further includes a mounting block. The mounting block is installed at a position of the door body corresponding to the hinge plate, and the first trajectory slot and the second trajectory slot are disposed on the mounting block. The mounting block includes a first mounting block disposed at the upper end of the door body and a second mounting block disposed at the lower end of the door body. The second mounting block includes a plate body and a second extending portion. An upper surface of the plate body extends upwards to constitute the second extending portion of the second mounting block, and a lower surface of the plate body is recessed upwards onto the second extending portion, so as to constitute the first trajectory slot and the second trajectory slot. A second accommodating groove is disposed at the lower end of the door body. The second mounting block is inserted into the second accommodating groove, and the plate body is fixedly connected to the door body by means of a screw. The second mounting block further includes a locking hook structure. The locking hook structure includes a locking hook disposed on an inner side of the plate body. The locking hook extends toward the inner side of the plate body and is bent towards a rear side of the door body. An opening of the locking hook faces the plate body, and a free end of the locking hook is located on the rear side of the door body. The hinge plate located at the lower end of the door body further includes a blocking portion. The blocking portion is disposed on an inner side of the first extending portion and extends in a direction away from the first extending portion. In a case where the door body is in a closed state, the locking hook on the door body hooks the blocking portion of the hinge plate. The refrigerator further includes a limiting block. The limiting block is disposed at the lower end of the door body and located at a front end of the second mounting block. In a case where the door body rotates to a maximum allowable position, the limiting block abuts against a side of the hinge plate, so as to prevent the door body from continuing to rotate. In a case where the door body is in the closed state, the first hinge shaft is closer to the side wall and farther away from the front wall than the second hinge shaft, a first distance between the first hinge shaft and the second hinge shaft in a front-rear direction is greater than or equal to 2.5 mm and less than or equal to 10 mm, and a second distance between the first hinge shaft and the second hinge shaft in a left-right direction is greater than or equal to 7.5 mm and less than or equal to 30 mm. In a case where the door body is in the closed state, the first hinge shaft is located at an end portion of the first trajectory slot, and the second hinge shaft is located at an end portion of the second trajectory slot. The first hinge shaft moves from an end of the first trajectory slot to another end of the first trajectory slot and the second hinge shaft moves from an end of the second trajectory slot to another end of the second trajectory slot during an entire process of opening the door body. The first trajectory slot includes a first positioning position and a second positioning position, and a movement trajectory of the first hinge shaft in the first trajectory slot from the first positioning position to the second positioning position is a first positioning trajectory line. The second trajectory slot includes a first guiding position and a second guiding position, and a movement trajectory of the second hinge shaft in the second trajectory slot from the first guiding position to the second guiding position is a first guiding trajectory line. In a case where the door body is opened from the closed state to a first state, the first hinge shaft moves from the first positioning position to the second positioning position along the first positioning trajectory line with respect to the first trajectory slot. Meanwhile, the second hinge shaft moves from the first guiding position to the second guiding position along the first guiding trajectory line with respect to the second trajectory slot. The second positioning position is farther away from the front wall and closer to the side wall than the first positioning position, and the first positioning trajectory line extends in a direction away from the front wall and proximate to the side wall. The second guiding position is farther away from the front wall and closer to the side wall than the first guiding position, and the first guiding trajectory line extends in a direction away from the front wall and proximate to the side wall. The first trajectory slot further includes a third positioning position, and a movement trajectory of the first hinge shaft in the first trajectory slot from the second positioning position to the third positioning position is a second positioning trajectory line. The second trajectory slot further includes a third guiding position, and a movement trajectory of the second hinge shaft in the second trajectory slot from the second guiding position to the third guiding position is a second guiding trajectory line. In a case where the door body continues to be opened from the first state to a second state, an opening angle of the door body in the second state is less than 90°, the first hinge shaft moves from the second positioning position to the third positioning position along the second positioning trajectory line with respect to the first trajectory slot, and the second hinge shaft moves from the second guiding position to the third guiding position along the second guiding trajectory line with respect to the second trajectory slot. The third positioning position is closer to the front wall and the side wall than the second positioning position, and the second positioning trajectory line extends from the second positioning position to the third positioning position in a direction proximate to the front wall and the side wall, so that the door body moves a third distance inward. The third guiding position is farther away from the front wall and closer to the side wall than the second guiding position, and the second guiding trajectory line extends in a direction away from the front wall and proximate to the side wall.

DETAILED DESCRIPTION

Figure 1:
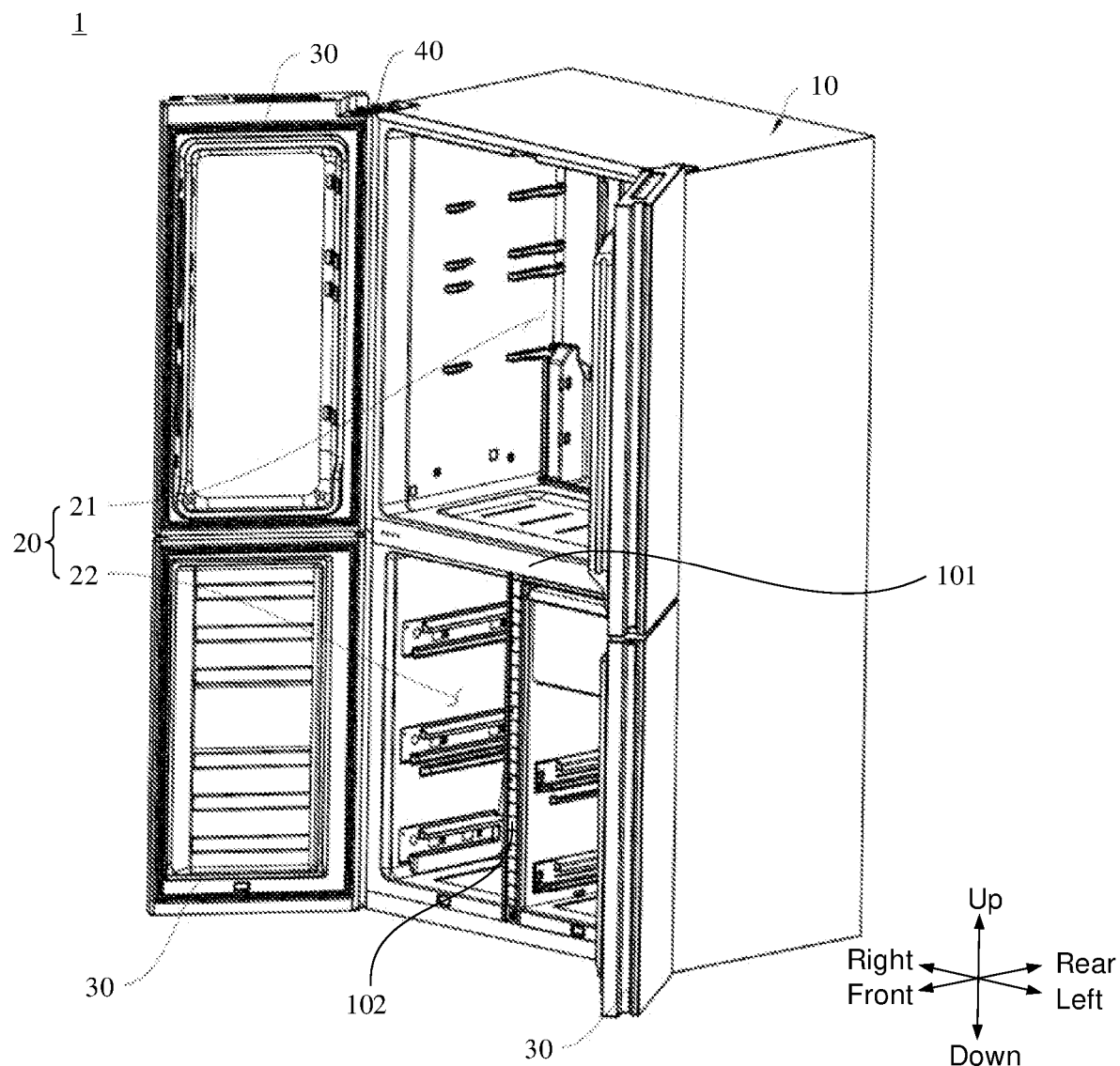
FIG. 1 is a diagram showing a structure of a refrigerator, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the term "connected," and derivative thereof may be used. The term "connected" should be understood in a broad sense. For example, the term "connected" may represent a fixed connection, a detachable connection, or a one-piece connection, or may represent a direct connection, or may represent an indirect connection through an intermediate medium. The embodiments disclosed herein are not necessarily limited to the content herein.

The phrase "at least one of A, B, and C" has the same meaning as the phrase "at least one of A, B, or C," both including the following combinations of A, B, and C: only A, only B, only C, a combination of A and B, a combination of A and C, a combination of B and C, and a combination of A, B, and C.

The use of the phase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system).

Orientations or positional relationships indicated by the terms such as "center," "upper," "lower," "front," "rear," "left," "right," "vertical," "horizontal," "top," "bottom," "inner," "outer," and the like as used herein are based on orientations or positional relationships shown in the drawings, which are merely to facilitate and simplify the description of the present disclosure, and are not to indicate or imply that the devices or elements referred to must have a particular orientation, or must be constructed or operated in a particular orientation. Therefore, these terms will not be construed as limitations on the present disclosure.

In consideration of convenience, a side of a refrigerator facing a user during use is defined as a front side, and a side opposite to the front side is defined as a rear side.

For built-in refrigerators, there is usually a small gap between an inner side wall of a cabinet and left and right side walls of the refrigerator, so as to facilitate heat dissipation of the refrigerator. However, hinge structures on door bodies of the refrigerator are usually in a form of a single shaft. During the process of opening the door body with such hinge structure, corners of the door body easily extend far beyond a side of a refrigerator body, so that the door body easily collides with the inner side wall of the cabinet, or the inner side wall of the cabinet easily interferes with the door body, causing the door body to fail to be opened normally, which affects the normal use of the refrigerator.

In order to solve the above problem, in some embodiments of the present disclosure, a refrigerator is provided.

FIG. 1 is a diagram showing a structure of a refrigerator, in accordance with some embodiments. Referring to FIG. 1, the refrigerator 1 includes a refrigerator body 10, a door body 30, and a cold air supply device. The refrigerator body 10 has a storage chamber 20. The door body 30 is rotatably connected to the refrigerator body 10 to open and close the storage chamber 20. The cold air supply device is configured to supply cold air to the storage chamber 20, so as to cool the storage chamber 20.

In some embodiments, the cold air supply device cools the storage chamber 20 by performing heat exchange with air outside the refrigerator body 10. The cold air supply device includes an evaporator, a compressor, a condenser, and a throttling device. Refrigerant circulates in a sequence of the compressor, the condenser, the throttling device, the evaporator, and the compressor to cool the storage chamber 20.

In some embodiments, the refrigerator body 10 includes an inner shell, an outer shell, and an insulator. The inner shell defines the storage chamber 20. The outer shell is connected to an outside of the inner shell, so as to form an appearance of the refrigerator 1. The insulator is disposed between the inner shell and the outer shell and configured to insulate the storage chamber 20.

In some embodiments, as shown in FIG. 1, the refrigerator body 10 includes a first partition plate 101 and a second partition plate 102. The first partition plate 101 is disposed at a substantially middle position of the refrigerator body 10 and extends substantially along a width direction (i.e., a left-right direction) of the refrigerator body 10, so as to divide the storage chamber 20 into an upper storage chamber 21 and a lower storage chamber 22. The second partition plate 102 is located in the lower storage chamber 22 and extends substantially along a height direction (i.e., an up-down direction) of the refrigerator body 10, so as to divide the lower storage chamber 22 into two sub-chambers. In some embodiments, the upper storage chamber 21 may serve as a refrigerating chamber for storing food in a refrigerating mode by maintaining air at a temperature within a range of about 0° C. to 5° C., and the lower storage chamber 22 may serve as a freezing chamber for storing food in a freezing mode by maintaining air at a temperature within a range of 0° C. to minus 30° C. (i.e., −30° C.).

In some embodiments, a front portion of the storage chamber 20 is open for putting in and taking out food, and the open front portion of the storage chamber 20 may be opened and closed by the rotatable door body 30.

In some embodiments, the refrigerator 1 may include a plurality of door bodies 30. For example, as shown in FIG. 1, the refrigerator 1 includes four door bodies 30. Two door bodies 30 correspond to the upper storage chamber 21, so as to close or open the upper storage chamber 21, and another two door bodies 30 correspond to the two sub-chambers of the lower storage chamber 22, respectively, so as to close or open the two sub-chambers. Of course, the refrigerator 1 may further include one, two, three, or more door bodies 30.

In some embodiments, the door body 30 may be rotatably supported by at least one of a hinge located at an upper end of the door body 30 or a hinge located at a lower end of the door body 30. For example, the refrigerator 1 further includes a hinge, the hinge is disposed on at least one of the upper end or the lower end of the door body 30, so as to rotatably support the door body 30.

The hinge in some embodiments of the present disclosure will be described in detail below.

Figure 2:
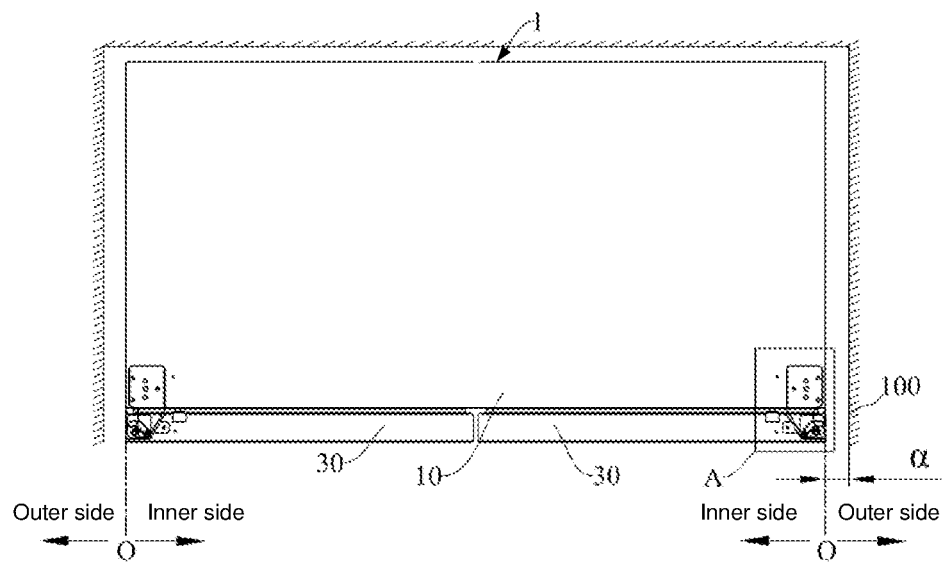
FIG. 2 is a top view of a refrigerator, in accordance with some embodiments.
Figure 3:
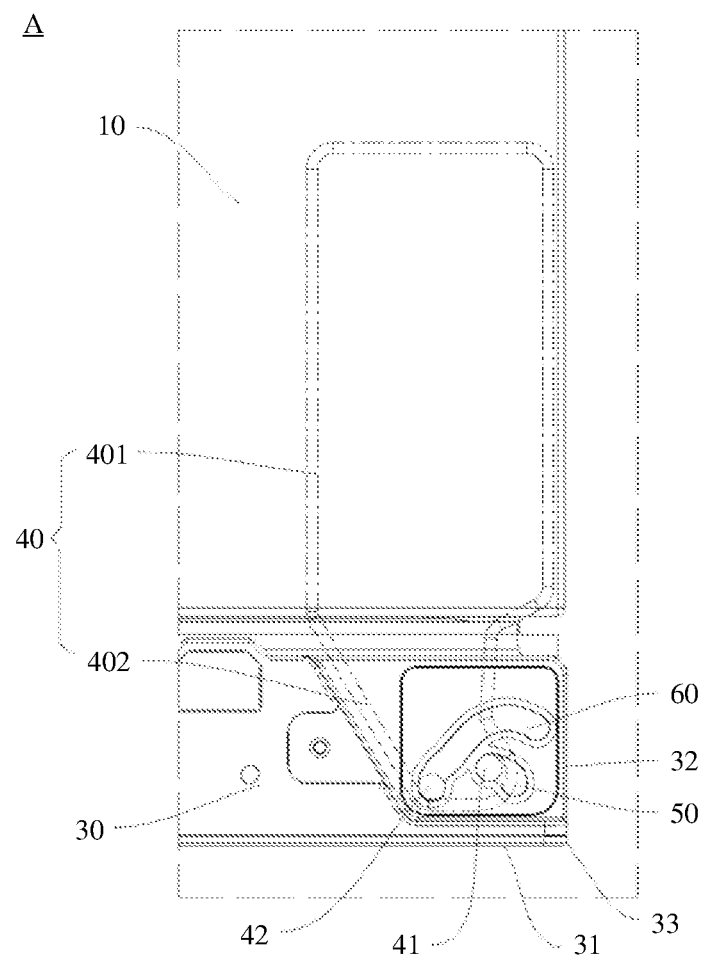
FIG. 3 is a partial enlarged view of the region A in FIG. 2.
Figure 4:
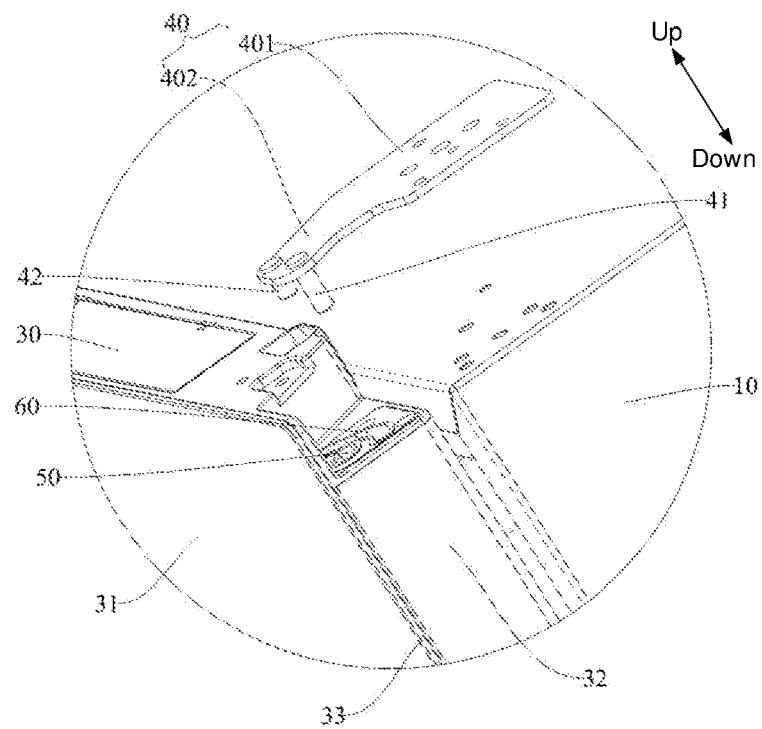
FIG. 4 is an exploded view of a hinge in a refrigerator, in accordance with some embodiments.
Figure 5:
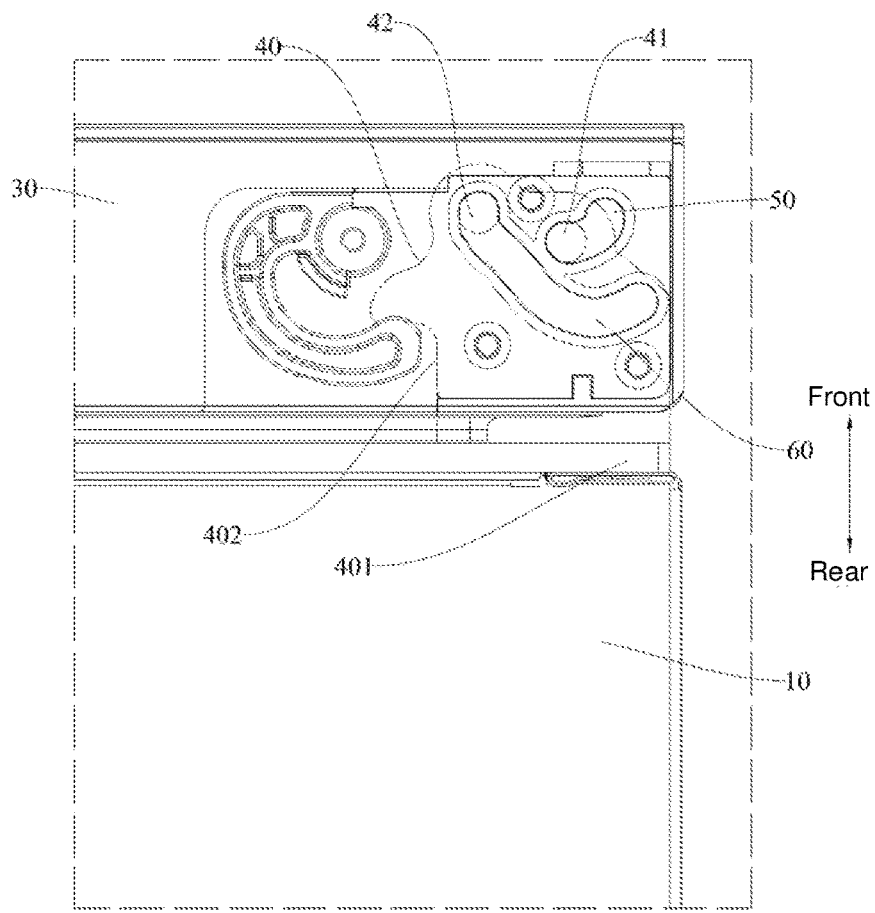
FIG. 5 is a bottom view of a door body in a refrigerator, in accordance with some embodiments.
Figure 6:
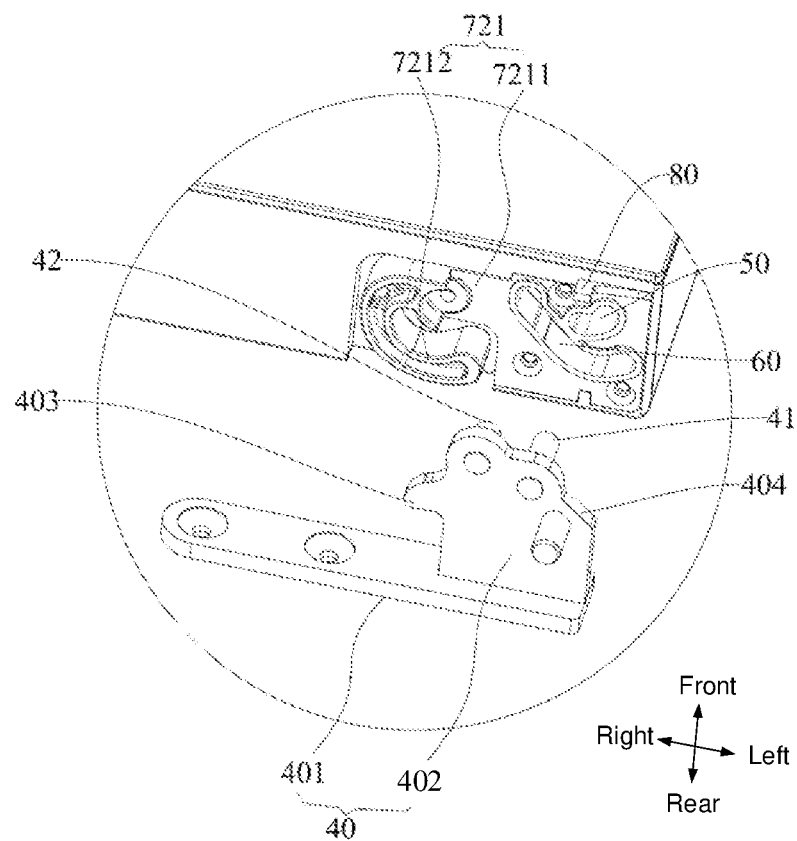
FIG. 6 is an exploded view of the hinge in FIG. 5.

FIG. 2 is a top view of a refrigerator, in accordance with some embodiments. FIG. 3 is a partial enlarged view of the region A in FIG. 2. FIG. 4 is an exploded view of a hinge in a refrigerator, in accordance with some embodiments. FIG. 4 illustrates a hinge located at an upper left corner of the refrigerator 1, and FIG. 4 illustrates the hinge located at the upper end of the door body 30. FIG. 5 is a bottom view of a door body in a refrigerator, in accordance with some embodiments. FIG. 5 illustrates the hinge located at the lower end of the door body 30. FIG. 6 is an exploded view of the hinge in FIG. 5.

In some embodiments, referring to FIGS. 2 to 4, the hinge includes a first hinge shaft 41, a second hinge shaft 42, a first trajectory slot 50, and a second trajectory slot 60. The first hinge shaft 41 is matched with the first trajectory slot 50, and the second hinge shaft 42 is matched with the second trajectory slot 60. The first hinge shaft 41 moves in the first trajectory slot 50, and the second hinge shaft 42 moves in the second trajectory slot 60 during a process of opening or closing the door body 30.

The hinge further includes a hinge plate 40, and the hinge plate 40 is fixedly connected to the refrigerator body 10. For example, as shown in FIGS. 3 and 4, for the hinge located at the upper end of the door body 30, the hinge plate 40 is connected to the upper end of the refrigerator body 10. As shown in FIGS. 5 and 6, for the hinge located at the lower end of the door body 30, the hinge plate 40 is connected to a side (e.g., a front surface) of the refrigerator body 10 proximate to the door body 30.

The first hinge shaft 41 and the second hinge shaft 42 are connected to the hinge plate 40, so as to form rotation shafts. In some embodiments, the hinge plate 40, the first hinge shaft 41, and the second hinge shaft 42 may be a one-piece member. Of course, the hinge plate 40, the first hinge shaft 41, and the second hinge shaft 42 may also be separate pieces or members, and the first hinge shaft 41 and the second hinge shaft 42 may be detachably connected to the hinge plate 40.

In some embodiments, as shown in FIGS. 3 and 4, the hinge plate 40 includes a connecting portion 401 and a first extending portion 402. The connecting portion 401 is connected to the refrigerator body 10, and a side of the connecting portion 401 proximate to the door body 30 extends along a direction (e.g., forward) proximate to the door body 30, so as to form the first extending portion 402. The connecting portion 401 and the first extending portion 402 may each be in a shape of a plate.

For example, as shown in FIGS. 3 and 4, for the hinge located at the upper end of the door body 30, the connecting portion 401 of the hinge plate 40 is fixedly connected to the upper end of the refrigerator body 10, and the connecting portion 401 and the first extending portion 402 are in a shape of a plate extending substantially horizontally. As shown in FIGS. 5 and 6, for the hinge located at the lower end of the door body 30, the connecting portion 401 of the hinge plate 40 is fixedly connected to the front surface of the refrigerator body 10 and extends substantially along a height direction (e.g. the up-down direction) of the refrigerator 1. The first extending portion 402 of the hinge plate 40 extends substantially along a length direction (e.g., a front-rear direction) of the refrigerator 1. Moreover, the connecting portion 401 and the first extending portion 402 are each in a shape of a plate.

In some embodiments, the connecting portion 401 may be fixed on the refrigerator body 10 by means of fasteners such as screws, pins, and bolts.

In some embodiments, the first hinge shaft 41 and the second hinge shaft 42 are disposed on the first extending portion 402 and extend along the height direction of the refrigerator 1. For example, for the hinge located at the upper end of the door body 30, the first hinge shaft 41 and the second hinge shaft 42 extend in a direction (e.g., vertically downwards) proximate to the door body 30. For the hinge located at the lower end of the door body 30, the first hinge shaft 41 and the second hinge shaft 42 extend in a direction (e.g., vertically upwards) proximate to the door body 30.

In some embodiments, corresponding to the positions of the hinge plates 40, the upper and lower ends of the door body 30 are each provided with the first trajectory slot 50 and the second trajectory slot 60.

For convenience of description, a side of left and right sides of the door body 30 proximate to the hinge plate 40 is referred to as a side wall 32. For example, in a case where the hinge plate 40 is located on a right side of the refrigerator body 10, the right side of the door body 30 is the side wall 32, and in a case where the hinge plate 40 is located on a left side of the refrigerator body 10, the left side of the door body 30 is the side wall 32. A front wall 31 and the side wall 32 of the door body 30 meet to form a side edge 33.

Moreover, with continued reference to FIG. 2, planes where sides (i.e., left and right surfaces) of the refrigerator body 10 proximate to the hinge plate 40 and a cabinet 100 are located are defined as a reference plane O. A side of the reference plane O proximate to the cabinet 100 is an outer side, and another side of the reference plane O opposite to the side of the reference plane O proximate to the cabinet 100 is an inner side. In a case where the refrigerator 1 is placed in the cabinet 100 for use, in order to prevent factors such as uneven ground and deformation of the cabinet 100 from affecting the use of refrigerator 1, a distance α between the cabinet 100 and the surface (i.e., the reference plane O) of the refrigerator 1 is substantially equal to 5 mm (i.e., α=5 mm). In this case, the side edge 33 of the door body 30 cannot extend too far beyond the side (i.e., the reference plane O) of the refrigerator body 10 during the rotation of the door body 30. Otherwise, the side edge 33 collides with the cabinet 100 and the door body 30 cannot be opened normally.

Therefore, the door body 30 needs to be able to move to the inner side of the reference plane O during the rotation process, so as to prevent the side edge 33 from extending too far beyond the side of the refrigerator body 10. Here, for the door body 30 proximate to the right side of the refrigerator 1, the inner side of the reference plane O is the left side of the refrigerator body 10. That is to say, the door body 30 may move to the left. For the door body 30 proximate to the left side of the refrigerator 1, the inner side of the reference plane O is the right side of the refrigerator body 10. That is to say, the door body 30 may move to the right.

There is a relative movement relationship between the first trajectory slot 50 and the first hinge shaft 41 and a relative movement relationship between the second trajectory slot 60 and the second hinge shaft 42. For example, if the first trajectory slot 50 and the second trajectory slot 60 serve as stationary reference objects during the process of opening the door body 30, then the first hinge shaft 41 moves in the first trajectory slot 50 and the second hinge shaft 42 moves in the second trajectory slot 60. For the convenience of description, the present disclosure is introduced by considering an example in which the first trajectory slot 50 and the second trajectory slot 60 are used as the reference objects, and the first hinge shaft 41 and the second hinge shaft 42 move with respect to the reference objects.

In some embodiments of the present disclosure, in a case where the door body 30 rotates to be opened from a closed state to a state with a 90° opening angle, a movement trajectory of the first hinge shaft 41 with respect to the first trajectory slot 50 substantially extends in a direction proximate to the side wall 32 and the front wall 31, and a movement trajectory of the second hinge shaft 42 with respect to the second trajectory slot 60 substantially extends in a direction away from the front wall 31 and proximate to the side wall 32, so that the door body 30 may move inwards for a distance while rotating, thereby avoiding a problem that the door body 30 cannot be opened normally due to interference between the side edge 33 extending beyond the reference plane O and the cabinet 100 during the process of opening the door body 30.

It will be noted that the opening angle may refer to an included angle between the door body 30 and the front surface of the refrigerator body 10. The 90° opening angle may mean that the included angle between the door body 30 and the front surface of the refrigerator body 10 is substantially a right angle. The closed state may mean that the included angle between the door body 30 and the front surface of the refrigerator body 10 is substantially equal to 0°.

Figure 7:
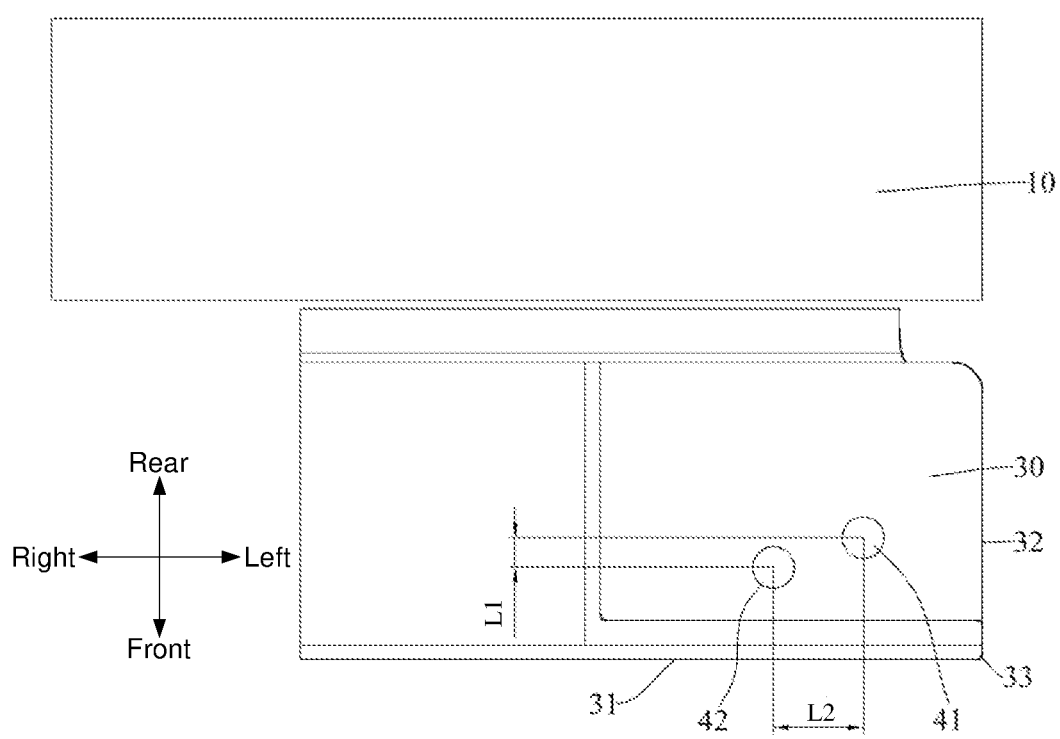
FIG. 7 is a diagram showing a structure of a first hinge shaft and a second hinge shaft, in accordance with some embodiments.

FIG. 7 is a diagram showing a structure of a first hinge shaft and a second hinge shaft, in accordance with some embodiments.

In some embodiments, referring to FIG. 7, in a case where the door body 30 is in the closed state, the first hinge shaft 41 is closer to the side wall 32 and farther away from the front wall 31 than the second hinge shaft 42.

A first distance L1 between the first hinge shaft 41 and the second hinge shaft 42 in the front-rear direction is greater than or equal to 2.5 mm and less than or equal to 10 mm (i.e., 2.5 mm≤L1≤10 mm).

A second distance L2 between the first hinge shaft 41 and the second hinge shaft 42 in the left-right direction is greater than or equal to 7.5 mm and less than or equal to 30 mm (i.e., 7.5 mm≤L2≤30 mm).

For example, in a case where the first distance L1 is equal to 5 mm, the second distance L2 is equal to 15 mm, and the thickness of the door body 30 is within a range of 44 mm to 53 mm, inclusive, the corner of the door body 30 may extend beyond the side of the refrigerator body 10 by a small distance β (e.g., the distance β is less than 3 mm) during the process of opening the door body 30.

Figure 8:
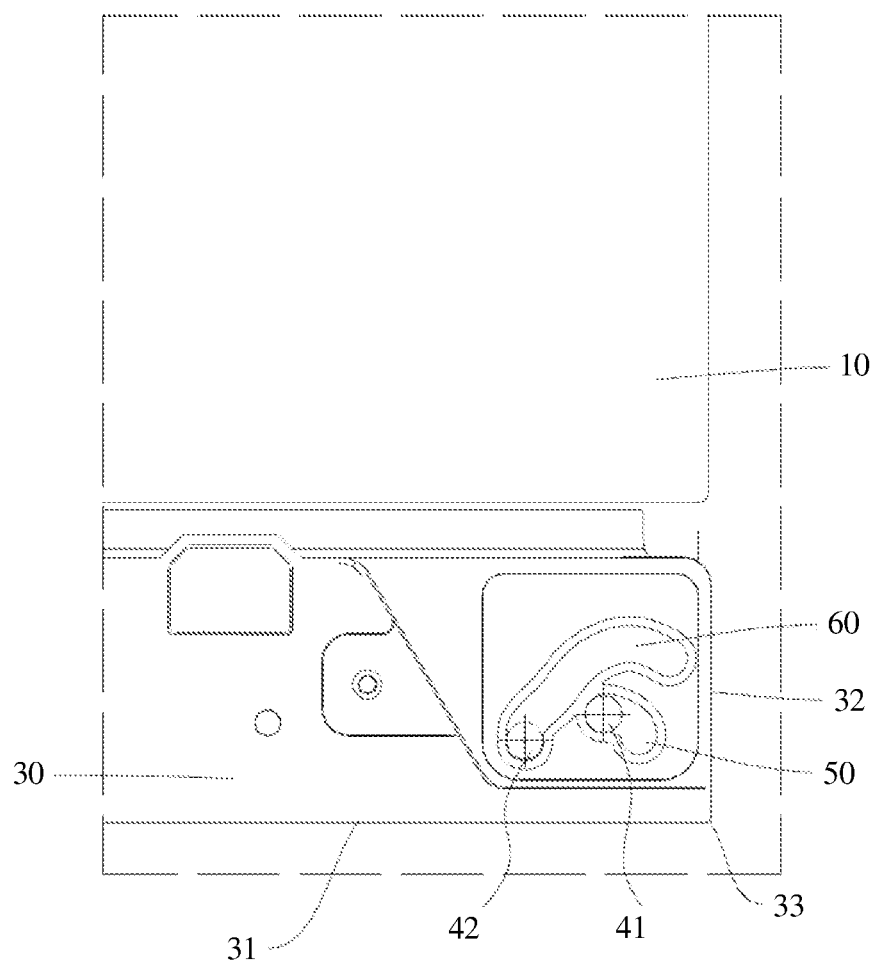
FIG. 8 is a diagram showing a structure of a door body of a refrigerator in a closed state, in accordance with some embodiments.
Figure 9:
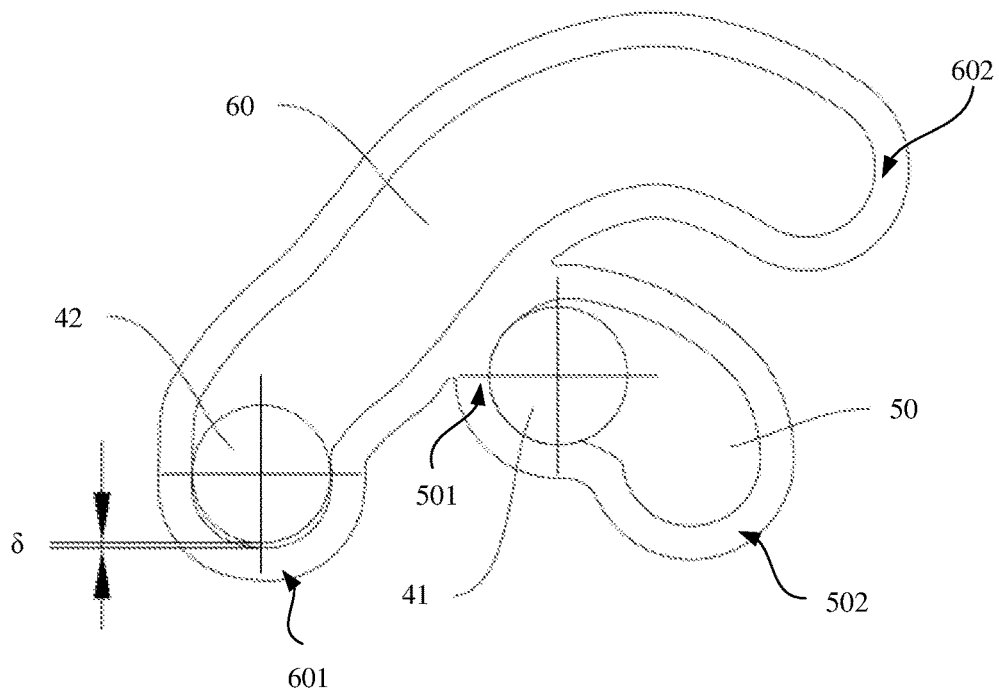
FIG. 9 is a partial enlarged view of the first hinge shaft, the second hinge shaft, the first trajectory slot, and the second trajectory slot in FIG. 8.

FIG. 8 is a diagram showing a structure of a door body of a refrigerator in a closed state, in accordance with some embodiments. FIG. 9 is a partial enlarged view of the first hinge shaft, the second hinge shaft, the first trajectory slot, and the second trajectory slot in FIG. 8.

In some embodiments, referring to FIGS. 8 and 9, in a case where the door body 30 is in the closed state, the first hinge shaft 41 is located at an end portion 501 of the first trajectory slot 50, and the second hinge shaft 42 is located at an end portion 601 of the second trajectory slot 60. Here, the two end portions may be starting end portions of the first trajectory slot 50 and the second trajectory slot 60, respectively. The first trajectory slot 50 extends substantially from the starting end portion 501 to another end portion 502 of the first trajectory slot 50 in a direction proximate to the side wall 32 and the front wall 31. The second trajectory slot 60 extends substantially from the starting end portion 601 to another end portion 602 of the second trajectory slot 60 in a direction away from the front wall 31 and proximate to the side wall 32. The first trajectory slot 50 and the second trajectory slot 60 each extend in a direction proximate to the side wall 32, so that the door body 30 may move toward the inner side of the reference plane O relative to the hinge plate 40.

In some embodiments, as shown in FIG. 9, in a case where the door body 30 is in the closed state, there is a gap δ between the second hinge shaft 42 and the starting end portion 602 of the second trajectory slot 60. In this way, when the door body 30 is forcefully closed, the second hinge shaft 42 may not be in contact with the starting end portion 602 of the second trajectory slot 60, thereby preventing the door body 30 from being bounced open.

The detailed process of rotating the door body 30 from the closed state to multiple states with different opening angles is introduced below.

First Stage

Figure 10:
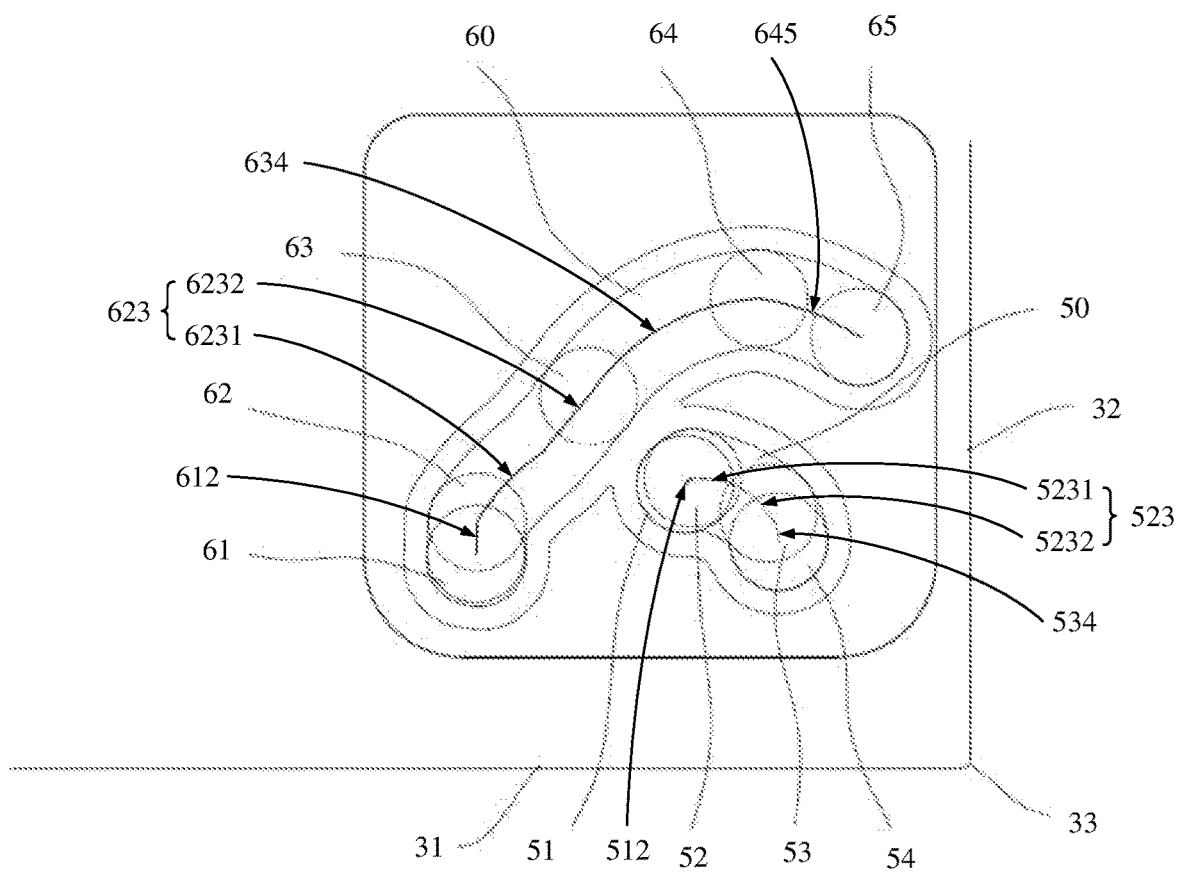
FIG. 10 is a schematic diagram of a plurality of movement positions of a first hinge shaft and a second hinge shaft, in accordance with some embodiments.

FIG. 10 is a schematic diagram of a plurality of movement positions of a first hinge shaft and a second hinge shaft, in accordance with some embodiments.

Referring to FIG. 10, the first trajectory slot 50 includes a first positioning position 51 and a second positioning position 52. A movement trajectory of the first hinge shaft 41 in the first trajectory slot 50 from the first positioning position 51 to the second positioning position 52 is a first positioning trajectory line. Correspondingly, the second trajectory slot 60 includes a first guiding position 61 and a second guiding position 62. A movement trajectory of the second hinge shaft 42 in the second trajectory slot 60 from the first guiding position 61 to the second guiding position 62 is a first guiding trajectory line.

Figure 11:
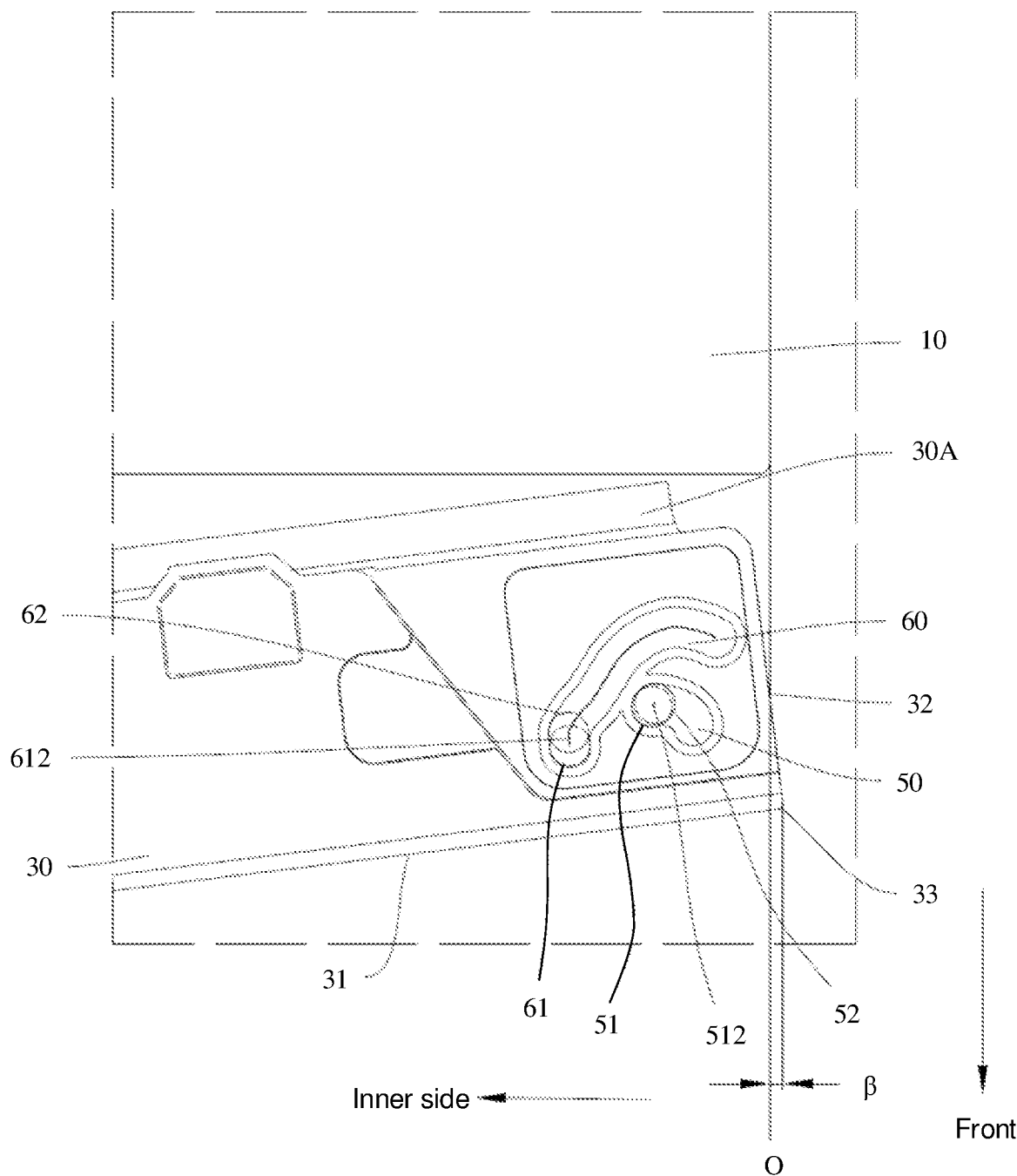
FIG. 11 is a diagram showing a structure of a door body of a refrigerator in a first state, in accordance with some embodiments.

FIG. 11 is a diagram showing a structure of a door body of a refrigerator in a first state, in accordance with some embodiments.

Referring to FIGS. 8 and 11, in a case where the door body 30 rotates from the closed state shown in FIG. 8 to the first state shown in FIG. 11, the first hinge shaft 41 moves from the first positioning position 51 to the second positioning position 52 along the first positioning trajectory line with respect to the first trajectory slot 50. Meanwhile, the second hinge shaft 42 moves from the first guiding position 61 to the second guiding position 62 along the first guiding trajectory line with respect to the second trajectory slot 60.

The second positioning position 52 is farther away from the front wall 31 and closer to the side wall 32 than the first positioning position 51, and the first positioning trajectory line extends in a direction away from the front wall 31 and proximate to the side wall 32. The second guiding position 62 is farther away from the front wall 31 and closer to the side wall 32 than the first guiding position 61, and the first guiding trajectory line extends in a direction away from the front wall 31 and proximate to the side wall 32.

In this way, the first hinge shaft 41 may move in a direction proximate to the side wall 32 and away from the front wall 31, which is equivalent to that the door body 30 provided with the first trajectory slot 50 moves a fourth distance in a direction (i.e., towards the inner side of the reference plane O) away from the side wall 32 and moves a distance in a direction (i.e., forward) proximate to the front wall 31. In this way, the door body 30 moves towards the inner side of the reference plane O, which may prevent the side edge 33 from extending too far beyond the side of the refrigerator body 10 to touch the cabinet 100.

Moreover, in a case where the door body 30 is just opened, an end (e.g., a left rear end) of the door body 30 proximate to the refrigerator body 10 and the cabinet 100 rotates in a direction (e.g., backwards) proximate to the refrigerator body 10 relative to the first hinge shaft 41. Therefore, a door seal 30A on the door body 30 easily comes into contact and friction with the front surface of the refrigerator body 10 as the door body 30 moves towards the inner side of the reference plane O. However, in some embodiments of the present disclosure, by providing the door body 30 to move forward, friction between the door seal 30A and the front surface of the refrigerator body 10 may be avoided, which may improve the service life of the door seal 30A.

In some embodiments, as shown in FIGS. 10 and 11, the first positioning trajectory line is a first straight line 512, and the first guiding trajectory line is a second straight line 612. However, in some other embodiments, the first positioning trajectory line and the first guiding trajectory line may also be curves.

It will be noted that in a case where the door body 30 is in the first state, the opening angle of the door body 30 is substantially within a range of 5° to 10°, inclusive. In this case, the distance β that the side edge 33 is beyond the side of the refrigerator body 10 may be substantially equal to 2 mm.

In some embodiments, in the first stage, an included angle between the first straight line 512 and the second straight line 612 may be greater than 45°, which may avoid the shaking of door body 30 due to a small included angle between the first straight line 512 and the second straight line 612 (that is, the first straight line 512 and the second straight line 612 are nearly parallel to each other), so as to improve stationarity of the door body 30 during the rotation process.

Second Stage

Referring to FIG. 10, the first trajectory slot 50 further includes a third positioning position 53. A movement trajectory of the first hinge shaft 41 in the first trajectory slot 50 from the second positioning position 52 to the third positioning position 53 is a second positioning trajectory line. Correspondingly, the second trajectory slot 60 further includes a third guiding position 63. A movement trajectory of the second hinge shaft 42 in the second trajectory slot 60 from the second guiding position 62 to the third guiding position 63 is a second guiding trajectory line.

Figure 12:
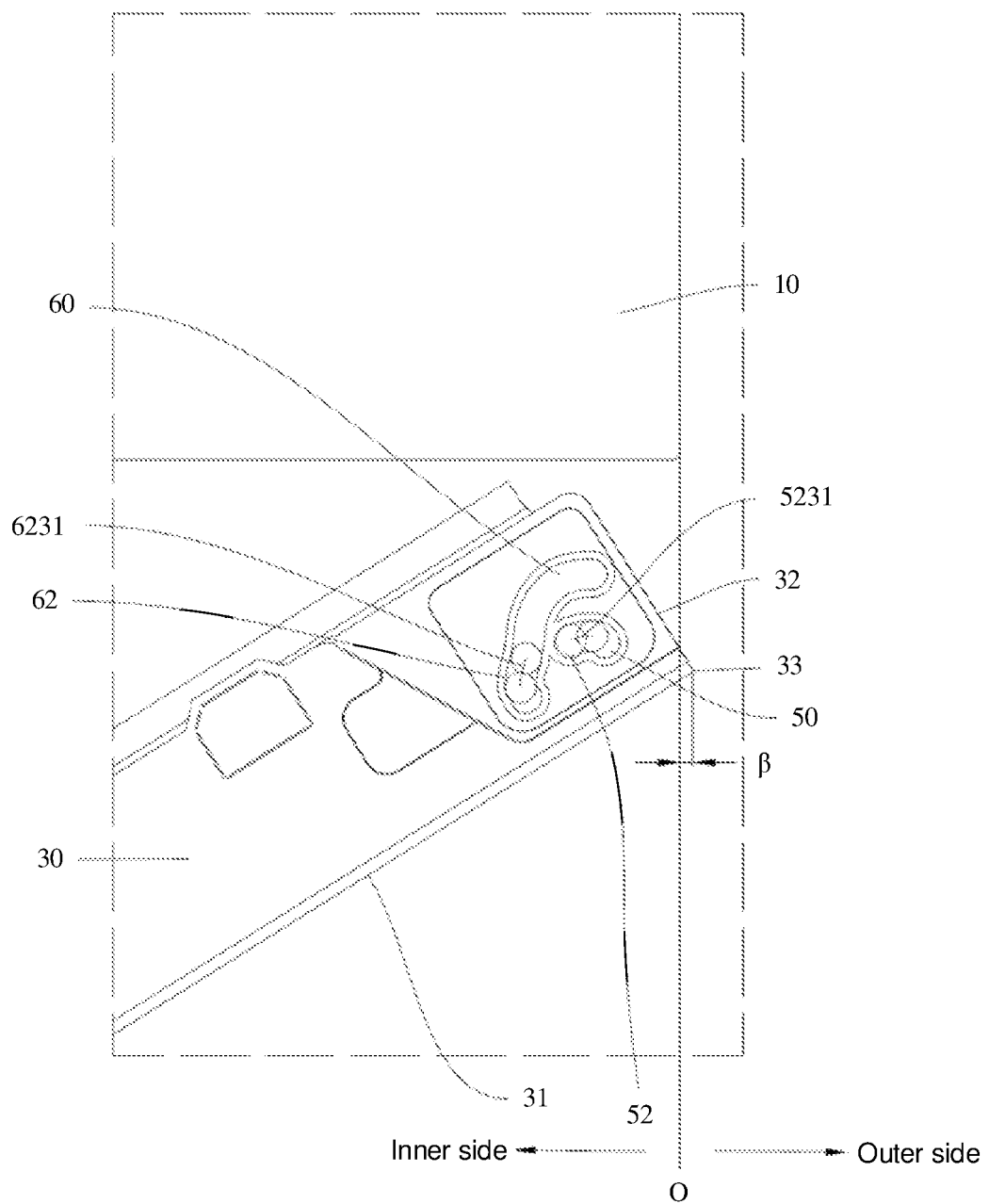
FIG. 12 is a diagram showing a structure of a door body of a refrigerator in a state between a first state and a second state, in accordance with some embodiments.
Figure 13:
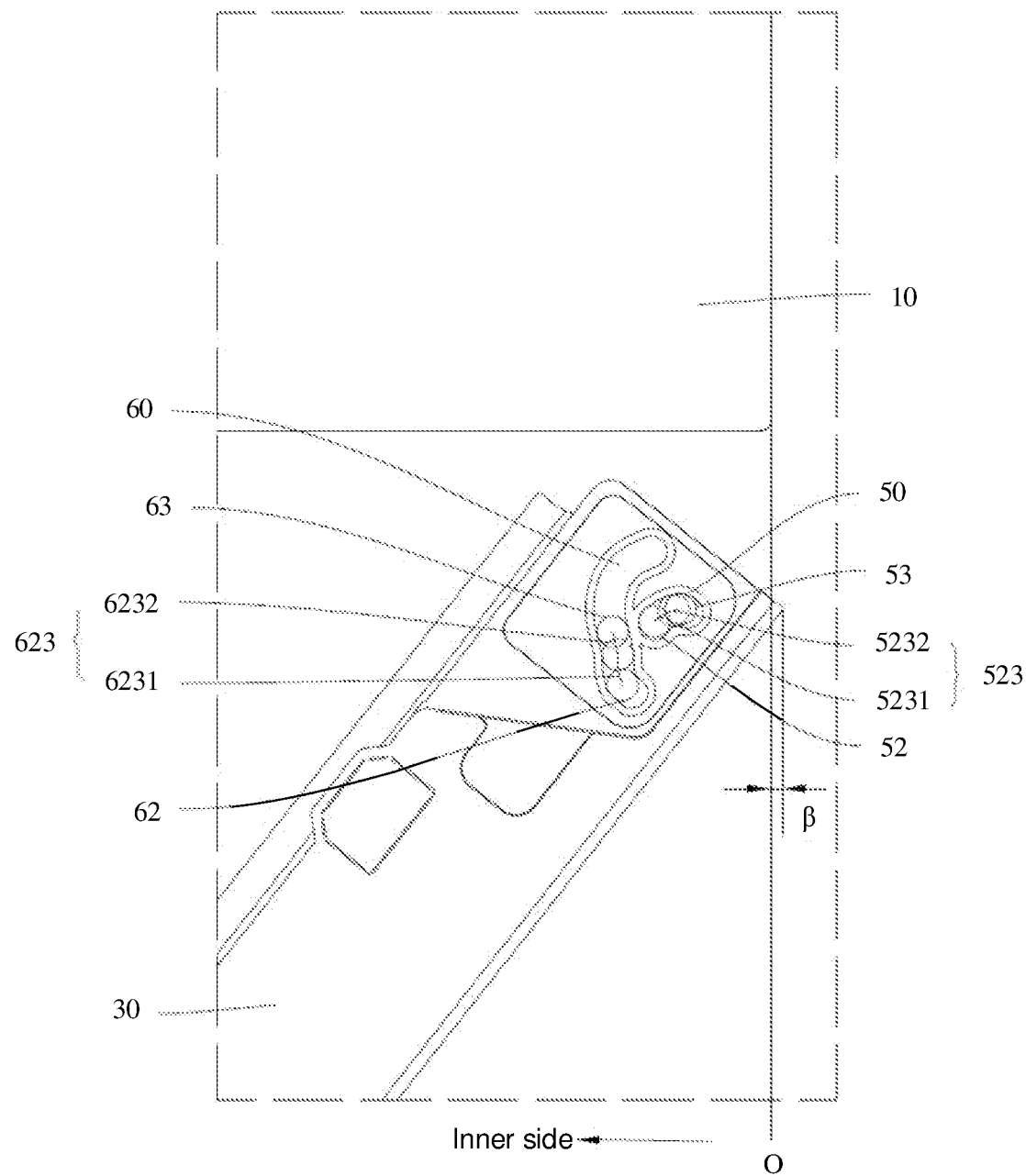
FIG. 13 is a diagram showing a structure of a door body of a refrigerator in a second state, in accordance with some embodiments.

FIG. 12 is a diagram showing a structure of a door body of a refrigerator in a state between a first state and a second state, in accordance with some embodiments. FIG. 13 is a diagram showing a structure of a door body of a refrigerator in a second state, in accordance with some embodiments.

Referring to FIGS. 12 and 13, in a case where the door body 30 continues to be opened from the first state shown in FIG. 11 to the second state shown in FIG. 13, the first hinge shaft 41 moves from the second positioning position 52 to the third positioning position 53 along the second positioning trajectory line with respect to the first trajectory slot 50. The second hinge shaft 42 moves from the second guiding position 62 to the third guiding position 63 along the second guiding trajectory line with respect to the second trajectory slot 60. It will be noted that in a case where the door body 30 is in the second state, the opening angle of the door body 30 is less than 90°.

The third positioning position 53 is closer to the front wall 31 and the side wall 32 than the second positioning position 52, and the second positioning trajectory line extends from the second positioning position 52 to the third positioning position 53 in a direction proximate to the front wall 31 and the side wall 32, so that the door body 30 may move a third distance towards the inner side of reference plane O.

The third guiding position 63 is farther away from the front wall 31 and closer to the side wall 32 than the second guiding position 62, and the second guiding trajectory line extends in a direction away from the front wall 31 and proximate to the side wall 32.

In some embodiments, as shown in FIGS. 10 and 13, the second positioning trajectory line is a first curve 523, and the second guiding trajectory line is a second curve 623. However, in some other embodiments, the second positioning trajectory line and the second guiding trajectory line may also be straight lines.

In a case where the door body 30 is in the closed state, a center of curvature of the first curve 523 is located on a side of the first curve 523 proximate to the front wall 31, and a center of curvature of the second curve 623 is located on a side of the second curve 623 proximate to the side edge 33.

In some embodiments of the present disclosure, the process of the door body 30 moving inwards when the door body 30 is opened is divided into two different stages (that is, a process of the door body 30 moving to the first state along a straight line and a process of the door body 30 moving to the second state along a curve), which may avoid a problem that the door body 30 shakes due to the trajectories being close to parallelism in a case where the door body 30 rotates at a large angle along a straight line or a curve.

In some embodiments, during a process of opening the door body 30 from the closed state to the second state, the side edge 33 rotates on the outer side of the reference plane O and moves towards the inner side of the reference plane O. During such process, the distance β that the side edge 33 is beyond the reference plane O is always less than the distance α between the reference plane O and the cabinet 100, so that the side edge 33 will not touch and interfere with the cabinet 100. Meanwhile, the side edge 33 is on the outer side of the reference plane O, which may avoid a problem that the user feels discontinuity when opening the door in a case where the door body 30 moves a large distance towards the inner side of the reference plane O.

In some embodiments, a distance from the second positioning position 52 to the third positioning position 53 is greater than a distance from the first positioning position 51 to the second positioning position 52, and a distance from the second guiding position 62 to the third guiding position 63 is greater than a distance from the first guiding position 61 to the second guiding position 62. That is to say, a length of the first straight line 512 is less than a length of the first curve 523, and a length of the second straight line 612 is less than a length of the second curve 623. In this way, the first hinge shaft 41 and the second hinge shaft 42 each may perform a linear movement with a small distance at the beginning, and then perform a curve movement with a large angle. The curve movement may improve continuity of the movement of the door body 30 and prevent the user from feeling discontinuity due to the door body 30 moving towards the inner side of the reference plane O when the door body 30 moves in a straight line.

In some embodiments, the first curve 523 and the second curve 623 each include at least two curve segments, a curvature of the multiple curve segments in each curve decreases sequentially.

As the curvature of the curve decreases, a distance that the door body 30 moves towards the inner side of the reference plane O in a case where the door body 30 is opened at a unit angle decreases. That is to say, the movement of the door body 30 moving inwards slows down during a process of the door body 30 rotating to be opened, so as to improve continuity of the door body 30 during movement.

In some embodiments, referring to FIGS. 10, 12, and 13, the first curve 523 includes a first curve segment 5231 and a third curve segment 5232 connected in sequence, and the second curve 623 includes a second curve segment 6231 and a fourth curve segment 6232 connected in sequence. A curvature of the third curve segment 5232 is less than that of the first curve segment 5231, and a curvature of the fourth curve segment 6232 is less than that of the second curve segment 6231.

In a case where the first hinge shaft 41 moves along the first curve segment 5231, the second hinge shaft 42 moves along the second curve segment 6231. During such process, the door body 30 moves inward for a fifth distance D1 when being opened at the unit angle. In a case where the first hinge shaft 41 moves along the third curve segment 5232, the second hinge shaft 42 moves along the fourth curve segment 6232. During such process, the door body 30 moves inward for a sixth distance D2 when being opened at the unit angle, and the sixth distance D2 is less than the fifth distance D1 (i.e., D2<D1). For example, the sixth distance D2 is half of the fifth distance D1.

Of course, in some other embodiments, the first curve 523 and the second curve 623 each may include three or more curve segments with decreasing curvature.

In some other embodiments, the curvatures of the first curve 523 and the second curve 623 each decrease. For example, the curvatures of the first curve 523 and the second curve 623 each decrease linearly. Of course, the decreasing trends of the curvatures of the first curve 523 and the second curve 623 may also be presented as other functions. In this way, the movement of the door body 30 moving inwards slows down during a process of the door body 30 rotating to be opened, so as to improve continuity of the door body 30 during movement.

Third Phase

Figure 14:
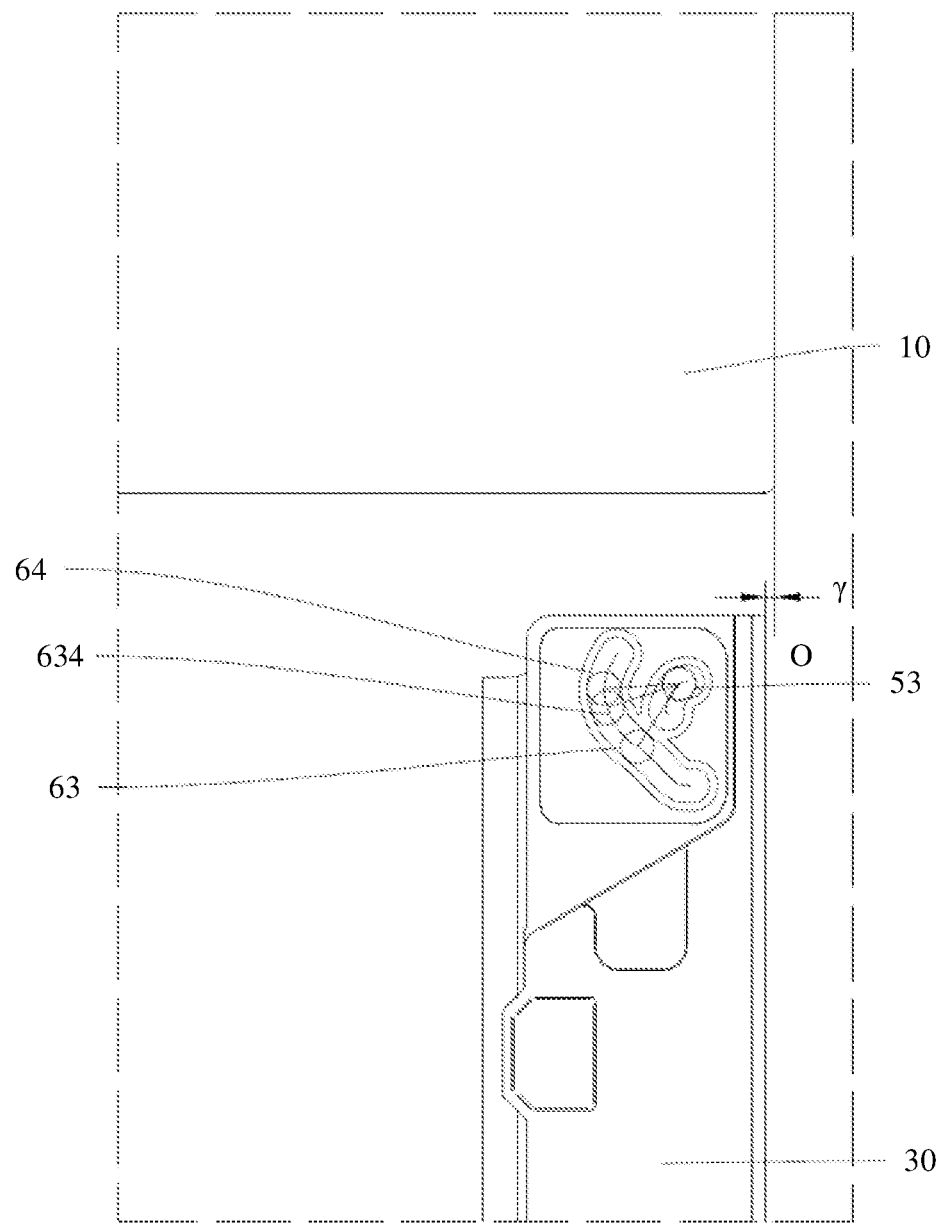
FIG. 14 is a diagram showing a structure of a door body of a refrigerator in a state with a 90° opening angle, in accordance with some embodiments.

FIG. 14 is a diagram showing a structure of a door body of a refrigerator in a state with a 90° opening angle, in accordance with some embodiments.

Referring to FIGS. 10 and 14, the second trajectory slot 60 further includes a fourth guiding position 64. A movement trajectory of the second hinge shaft 42 from the third guiding position 63 to the fourth guiding position 64 in the second trajectory slot 60 is a third guiding trajectory line.

In a case where the door body 30 continues to be opened from the second state shown in FIG. 13 to that state with the 90° opening angle shown in FIG. 14, the door body 30 performs a rotational movement. The position of the first hinge shaft 41 remains unchanged in the first trajectory slot 50, the door body 30 rotates with the first hinge shaft 41 as a center of a circle, and the second hinge shaft 42 moves to the fourth guiding position 64 along the third guiding trajectory line in the second trajectory slot 60. The third guiding trajectory line is a third curve 634 and in a shape of an arc, and the fourth guiding position 64 is farther from the front wall 31 and closer to the side wall 32 than the third guiding position 63.

In some embodiments, as shown in FIG. 14, in a case where the door body 30 is in the state with the 90° opening angle, there is a gap γ between the front wall 31 or the side edge 33 of the door body 30 and the side (i.e., the reference plane O) of the refrigerator body 10 in a thickness direction (e.g., the left-right direction) of the door body 30. That is to say, the front wall 31 is located on the inner side of the reference plane O, and a distance from the front wall 31 to the reference plane O is γ. The distance γ is greater than 0 (i.e., γ>0), so that the door body 30 may continue to be opened at a small angle without interfering with the cabinet 100. For example, in a case where the refrigerator 1 is disposed in the cabinet 100, the maximum opening angle of door body 30 is greater than 90°, and the opening angle of the door body 30 is substantially within a range of 105° to 110°, inclusive.

In some embodiments, after the third stage, the first trajectory slot 50 and the second trajectory slot 60 continue to extend, so as to guide the movement of a fourth stage of the hinge, so that the refrigerator 1 may be opened at a large angle in a case where the refrigerator 1 is used without being embedded in the cabinet 100.

Fourth Stage

Referring to FIG. 10, the first trajectory slot 50 further includes a first end position 54, and a movement trajectory of the first hinge shaft 41 from the third positioning position 53 to the first end position 54 in the first trajectory slot 50 is a third positioning trajectory line. Correspondingly, the second trajectory slot 60 further includes a second end position 65, and a movement trajectory of the second hinge shaft 42 from the fourth guiding position 64 to the second end position 65 in the second trajectory slot 60 is a fourth guiding trajectory line.

Figure 15:
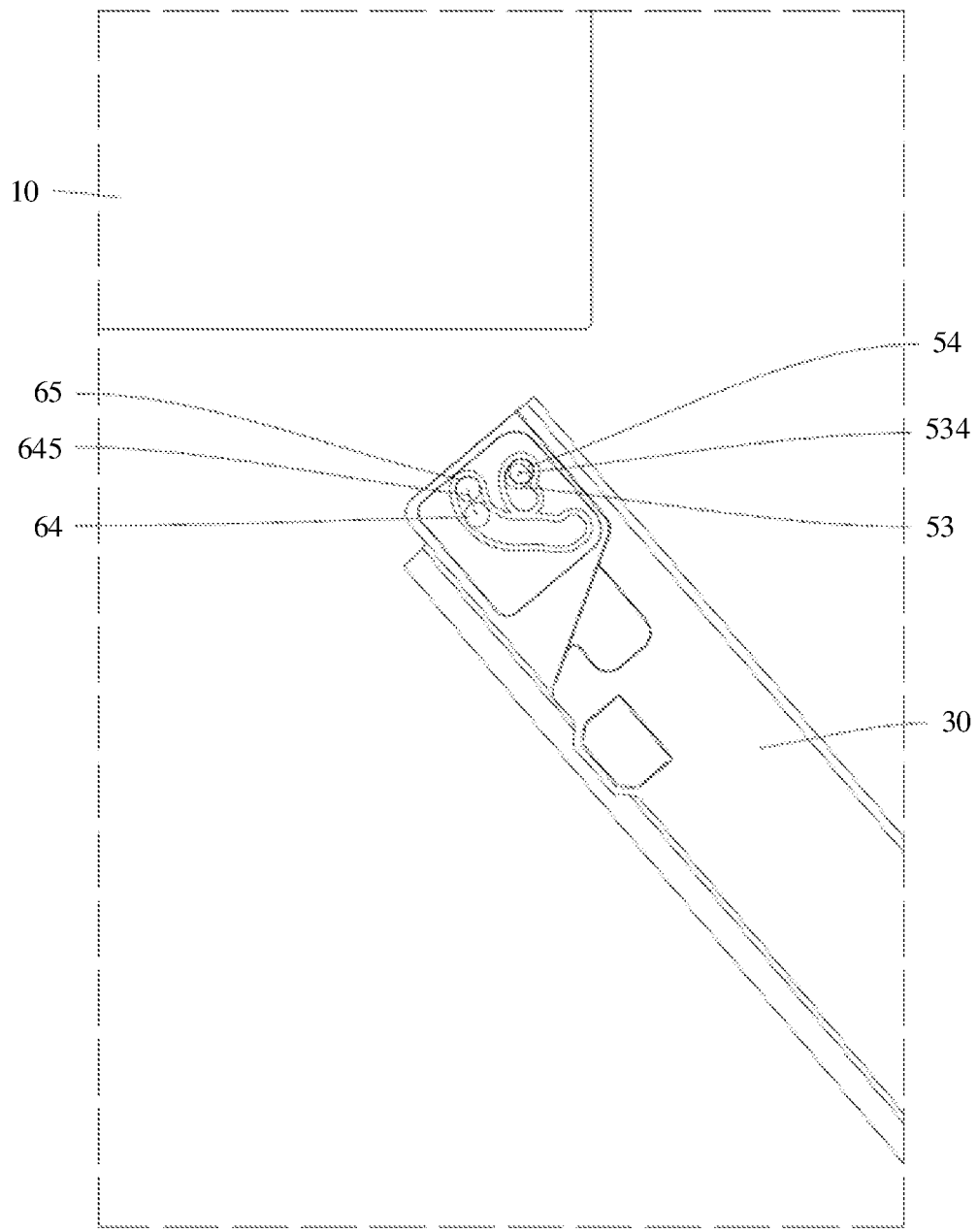
FIG. 15 is a diagram showing a structure of a door body of a refrigerator in a state with a maximum opening angle, in accordance with some embodiments.

FIG. 15 is a diagram showing a structure of a door body of a refrigerator in a state with a maximum opening angle, in accordance with some embodiments.

Referring to FIG. 15, in a case where the door body 30 continues to be opened from the state with the 90° opening angle as shown in FIG. 14, the first hinge shaft 41 moves from the third positioning position 53 to the first end position 54 along the third positioning trajectory line with respect to the first trajectory slot 50, and the second hinge shaft 42 moves from the fourth guiding position 64 to the second end position 65 along the fourth guiding trajectory line with respect to the second trajectory slot 60.

The first end position 54 is closer to the front wall 31 and the side wall 32 than the third positioning position 53, and the third positioning trajectory line extends from the third positioning position 53 to the first end position 54 in a direction proximate to the front wall 31 and the side wall 32. The second end position 65 is closer to the front wall 31 and the side wall 32 than the fourth guiding position 64, and the fourth guiding trajectory line extends from the fourth guiding position 64 to the second end position 65 in a direction proximate to the front wall 31 and the side wall 32.

It will be noted that, the extending directions of the trajectory lines use a movement direction of the first hinge shaft 41 relative to the first trajectory slot 50 or a movement direction of the second hinge shaft 42 relative to the second trajectory slot 60 during the process of opening the door body 30 as a reference.

In some embodiments, the third positioning trajectory line is a fourth curve 534, and the fourth guiding trajectory line is a fifth curve 645. However, in some other embodiments, the third positioning trajectory line and the fourth guiding trajectory line may also be straight lines.

If the movement trajectory of the door body 30 at the fourth stage is still the same as that at the third stage (that is, the door body 30 only performs the rotational movement), in a large rotation angle, a phenomenon may occur where the door body 30 shakes in a case where movement trends of the first hinge shaft 41 and the second hinge shaft 42 are parallel to each other. Therefore, at the fourth stage, by providing the side edge 33 of the door body 30 to move forward and inward for a distance while rotating, there may be an included angle between the movement trajectories of the first hinge shaft 41 and the second hinge shaft 42 at any group of corresponding points.

For example, an included angle between tangents of the movement trajectories of the first hinge shaft 41 and the second hinge shaft 42 at any group of corresponding points is greater than 30°, so as to improve the stationarity of the movement of the door body 30. It will be noted that a group of corresponding points are the positions of the first hinge shaft 41 and the second hinge shaft 42 in a case where the door body 30 is at an opening angle.

In some embodiments, a length of the first hinge shaft 41 may be greater than a length of the second hinge shaft 42. Correspondingly, a depth of the first trajectory slot 50 may be greater than a depth of the second trajectory slot 60.

The first hinge shaft 41 mainly plays a positioning role and the second hinge shaft 42 mainly plays a guiding role. Therefore, in the two hinge shafts, the first hinge shaft 41 is a main shaft and the second hinge shaft 42 is an auxiliary shaft, and the force is mainly concentrated on the main shaft. In this way, the first hinge shaft 41 may be set to be longer than the second hinge shaft 42, and the first trajectory slot 50 may be set to be deeper than the second trajectory slot 60. As a result, it is possible to avoid wasting material due to the second hinge shaft 42 being too long and also avoid a problem that the hinge shaft easily detaches from the trajectory slot due to the short first hinge shaft 41 in a case where the door body is inclined, so as to save material cost of the hinge on the basis of improving reliability of the structure of the hinge.

In some embodiments, a diameter of the first hinge shaft 41 may be greater than a diameter of the second hinge shaft 42. Since the force is concentrated on the first hinge shaft 41, the diameter of the first hinge shaft 41 may be greater than that of the second hinge shaft 42. In this way, the first hinge shaft 41 is thick and withstands a large force and has sufficient strength to withstand the force in a case where the door body 30 is inclined. Meanwhile, since the second trajectory slot 60 is long and occupies a lot of space in a thickness direction of the door body 30, the second hinge shaft 42 may be set to be thin. Correspondingly, the second trajectory slot 60 may be narrow, so that the door body 30 may be designed thin, and the overall thickness and the volume of the refrigerator 1 may be reduced.

Figure 16:
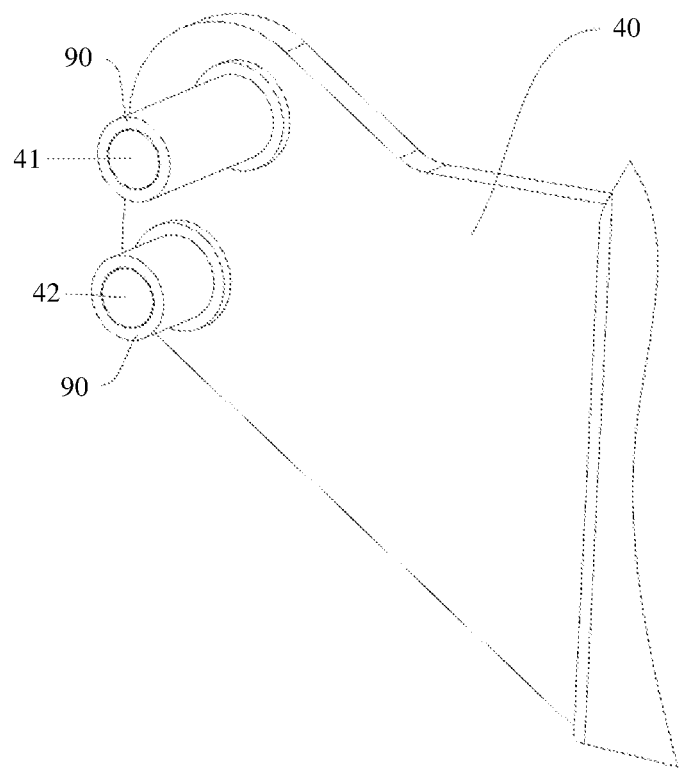
FIG. 16 is a diagram showing another structure of a first hinge shaft and a second hinge shaft, in accordance with some embodiments.

FIG. 16 is a diagram showing another structure of a first hinge shaft and a second hinge shaft, in accordance with some embodiments.

In some embodiments, as shown in FIG. 16, the hinge further includes a plurality of bushings 90. The plurality of bushings 90 are disposed outside the first hinge shaft 41 and the second hinge shaft 42, respectively, and the bushing 90 may rotate relative to the corresponding hinge shaft. During the movement of the hinge with two shafts, the bushing 90 rotates relative to the corresponding hinge shaft while the bushing 90 slides in the corresponding trajectory slot, thereby reducing friction and increasing the service life of the hinge.

In some embodiments, the bushing 90 may be made of wear-resistant polyformaldehyde (POM).

In some embodiments, the bushing 90 may be connected to the corresponding hinge shaft or the hinge plate 40 by means of a bearing.

In some other embodiments, the hinge may further include a plurality of linings. The plurality of linings may be made of POM and disposed on the inner walls of the first trajectory slot 50 and the second trajectory slot 60, respectively, so that the first hinge shaft 41 and the second hinge shaft 42 may move in the plurality of linings, respectively.

Of course, the hinge may further include a plurality of bushings 90 and a plurality of linings. Alternatively, one of the first hinge shaft 41 and the second hinge shaft 42 is provided with the bushing 90, and the trajectory slot corresponding to another of the first hinge shaft 41 and the second hinge shaft 42 is provided with the lining.

Figure 17:
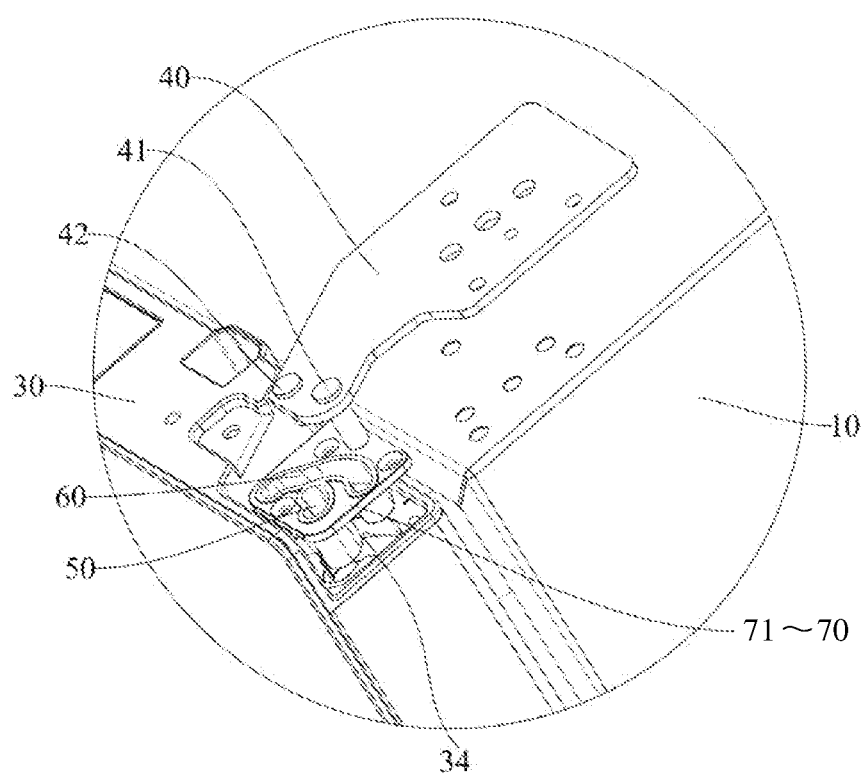
FIG. 17 is another exploded view of a hinge in a refrigerator, in accordance with some embodiments.
Figure 18:
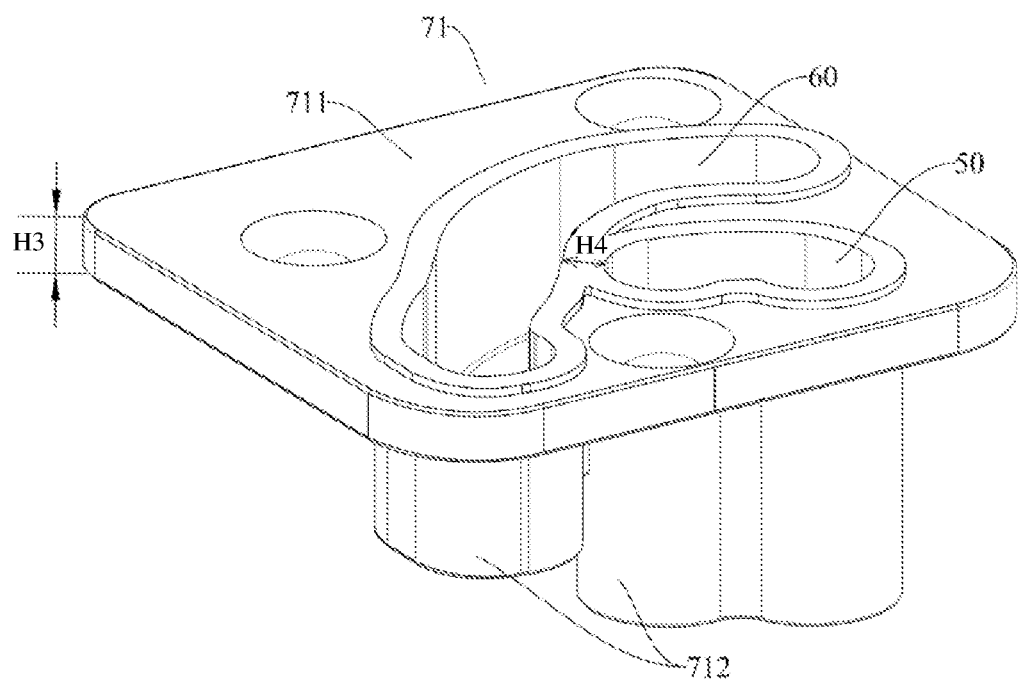
FIG. 18 is a diagram showing a structure of a first mounting block in a refrigerator, in accordance with some embodiments.
Figure 19:
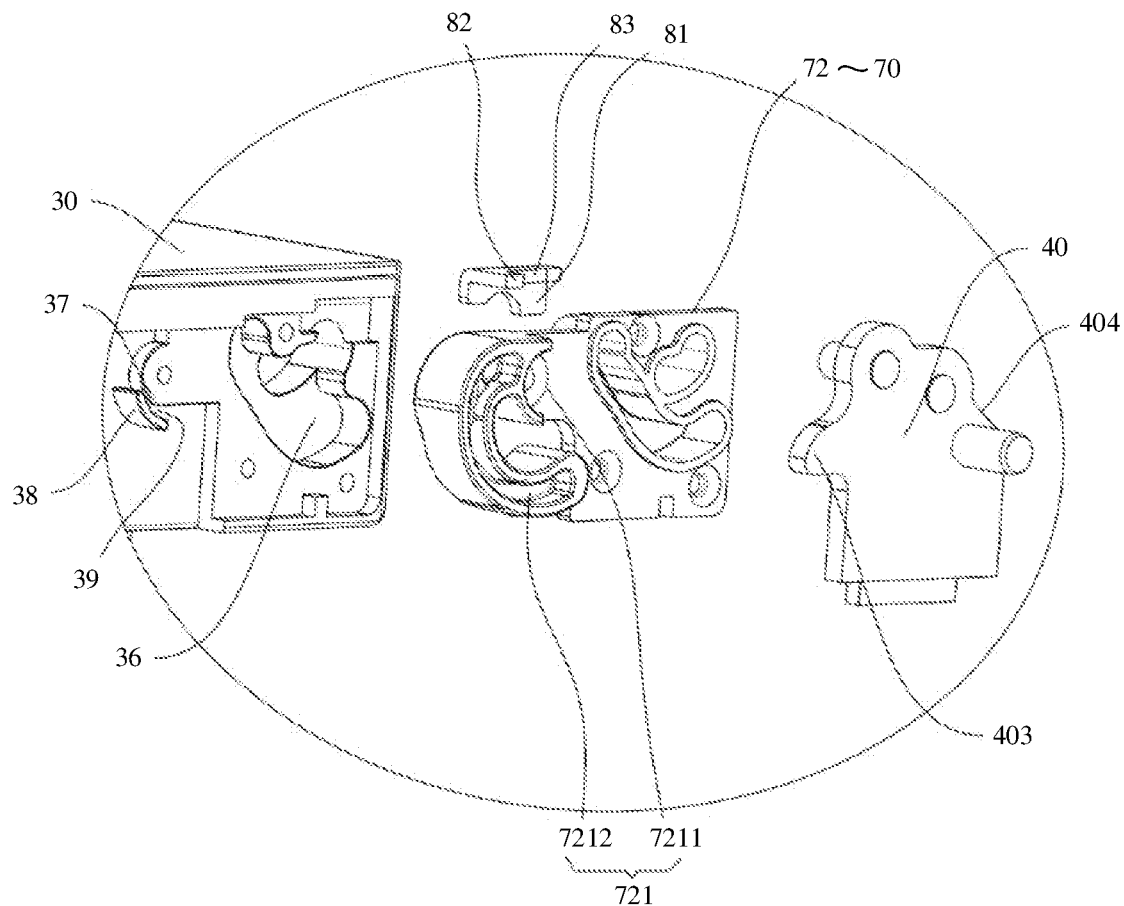
FIG. 19 is yet another exploded view of a hinge in a refrigerator, in accordance with some embodiments.
Figure 20:
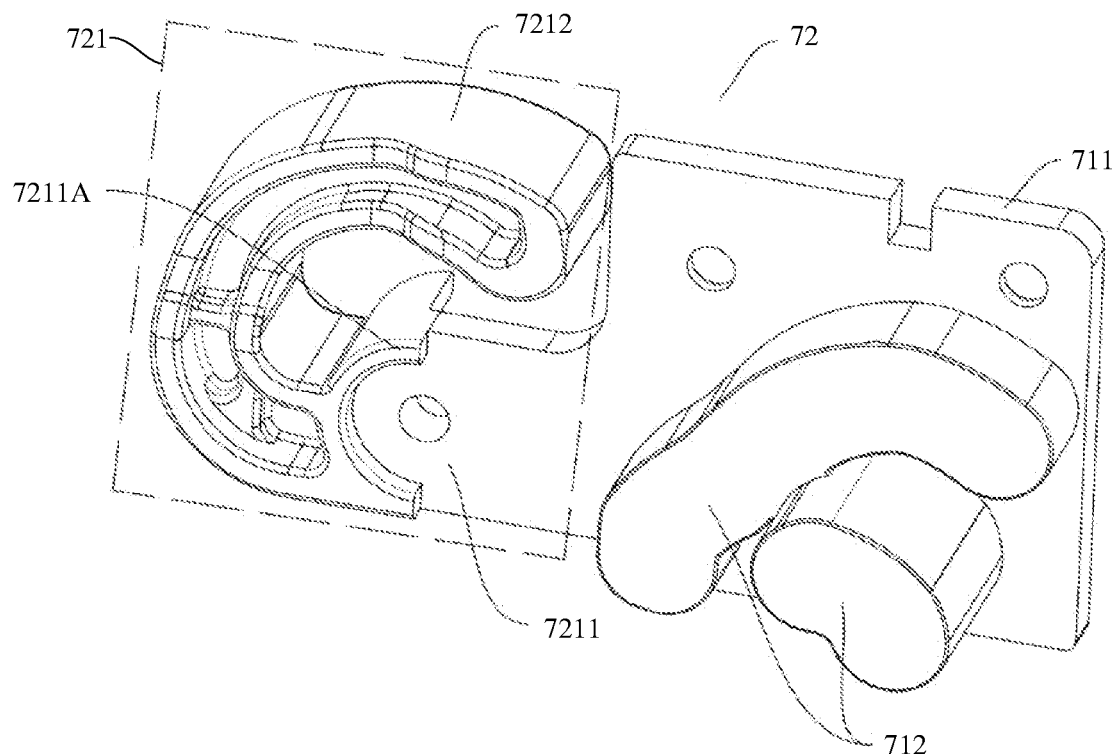
FIG. 20 is a diagram showing a structure of a second mounting block in a refrigerator, in accordance with some embodiments.

FIG. 17 is another exploded view of a hinge in a refrigerator, in accordance with some embodiments. FIG. 17 shows the hinge located at the upper left corner of the door body 30. FIG. 18 is a diagram showing a structure of a first mounting block in a refrigerator, in accordance with some embodiments. FIG. 19 is yet another exploded view of a hinge in a refrigerator, in accordance with some embodiments. FIG. 19 illustrates the hinge located at the lower end of the door body 30. FIG. 20 is a diagram showing a structure of a second mounting block in a refrigerator, in accordance with some embodiments.

In some embodiments, as shown in FIGS. 17 to 20, the refrigerator 1 further includes a mounting block 70. The mounting block 70 is disposed at a position of the door body 30 corresponding to the hinge plate 40, and the first trajectory slot 50 and the second trajectory slot 60 are disposed on the mounting block 70.

For example, the mounting block 70 includes a first mounting block 71 disposed at the upper end of the door body 30 and a second mounting block 72 disposed at the lower end of the door body 30.

Referring to FIGS. 17 and 18, the first mounting block 71 includes a plate body 711 and a second extending portion 712. A surface (e.g., a lower surface) of the plate body 711 proximate to the door body 30 extends in a direction (e.g., downwards) proximate to the door body 30, so as to form the second extending portion 712. A surface (e.g., an upper surface) of the plate body 711 away from the door body 30 is recessed downwards onto the second extending portion 712, so as to form the first trajectory slot 50 and the second trajectory slot 60. A shape of the second extending portion 712 is substantially the same as the shape of the two trajectory slots.

Correspondingly, the refrigerator 1 further includes a first accommodating groove 34. The first accommodating groove 34 is disposed at the upper end of the door body 30 and corresponds to the first mounting block 71. The first mounting block 71 may be inserted into the first accommodating groove 34, and the plate body 711 of the first mounting block 71 is fixedly connected to the door body 30 by means of fasteners (e.g., screws).

Referring to FIGS. 19 and 20, the second mounting block 72 includes the same structure as the plate body 711 and the second extending portion 712 of the first mounting block 71, and the first trajectory slot 50 and the second trajectory slot 60 of the hinge corresponding to the second mounting block 72 are also disposed on the second mounting block 72. For example, a surface (e.g., an upper surface) of the plate body 711 of the second mounting block 72 proximate to the door body 30 extends in a direction (e.g., upwards) proximate to the door body 30, so as to form the second extending portion 712 of the second mounting block 72. A surface (e.g., a lower surface) of the plate body 711 of the second mounting block 72 away from the door body 30 is recessed upwards onto the second extending portion 712, so as to form the first trajectory slot 50 and the second trajectory slot 60.

Correspondingly, the refrigerator 1 further includes a second accommodating groove 36. The second accommodating groove 36 is disposed at the lower end of the door body 30 and corresponds to the second mounting block 72. The second mounting block 72 may be inserted into the second accommodating groove 36, and the plate body 711 of the second mounting block 72 is fixedly connected to the door body 30 by means of fasteners (e.g., screws).

In some embodiments, the first mounting block 71 and the second mounting block 72 may be made of POM. The POM has a strong friction resistance characteristic and may improve the service life of the hinge.

In some embodiments, referring to FIG. 18, a minimum wall thickness H4 between the first trajectory slot 50 and the second trajectory slot 60 is 0.5 to 1 times a thickness H3 of the plate body 711 (i.e., H4=(0.5 to 1)×H3).

In this way, the distance between the first hinge shaft 41 and the second hinge shaft 42 may be small, so that the movement of the hinge will be less affected while the strength of the mounting block 70 will not be affected in a case where the door body 30 is slightly inclined or the two shafts are not parallel to each other.

In some embodiments, the second mounting block 72 may further include a locking hook structure. As shown in FIGS. 6, 19 and 20, the second mounting block 72 further includes a locking hook 721. The locking hook 721 is disposed on an inner side of the plate body 711 and extends toward the inner side of the plate body 711 and is bent toward a side (e.g., a rear side) of the door body 30 proximate to the refrigerator body 10. An opening of the locking hook 721 faces the plate body 711, and a free end of the locking hook 721 is located on the rear side of the door body 30.

Here, the inner side of the plate body 711 may be understood as a side of the plate body 711 away from the cabinet 100. For example, in a case where the second mounting block 72 is located on the left side of the door body 30, the inner side of the plate body 711 is a right side of the plate body 711. In a case where the second mounting block 72 is located on the right side of the door body 30, the inner side of the plate body 711 is a left side of the plate body 711. It will be noted that one end of the locking hook 721 is connected to the plate body 711, and another end of the locking hook 721 is bent and extends backwards, and the free end of the locking hook 721 refers to the another end of the locking hook 721.

Correspondingly, the hinge plate 40 located at the lower end of the door body 30 further includes a blocking portion 403. The blocking portion 403 is disposed on an inner side of the first extending portion 402 and extends in a direction away from the first extending portion 402. The blocking portion 403 is clamped with the locking hook 721. In a case where the door body 30 is in the closed state, the locking hook 721 hooks the blocking portion 403 to lock the door body 30, so as to avoid the door body 30 being not closed tightly to affect the refrigerating and freezing effects of the refrigerator 1. In a case where the door body 30 is opened, the locking hook 721 is deformed due to force and overcomes the obstruction of the blocking portion 403, thereby disengaging from the blocking portion 403. It will be noted that the inner side of the first extending portion 402 is similar to the inner side of the plate body 711, and details will not be repeated herein.

In some embodiments, as shown in FIGS. 19 and 20, the locking hook 721 includes a fixing portion 7211 and a hook portion 7212. The fixing portion 7211 is connected to the plate body 711, and the hook portion 7212 is connected to the fixing portion 7211 and bent backward. Fasteners (e.g., screws) may pass through the fixing portion 7211 and be connect with the door body 30, so as to strengthen the connection strength between the fixing portion 7211 and the door body 30, so that only the hook portion 7212 may be deformed when the locking hook 721 disengages from the blocking portion 403.

In some embodiments, a free end (i.e., the free end of the locking hook 721) of the hook portion 7212 and a free end (i.e., an end of the blocking portion 403 proximate to the locking hook 721) of the blocking portion 403 are each in a shape of an arc. Such is beneficial for the hook portion 7212 to hook or disengage from the blocking portion 403.

In some embodiments, as shown in FIG. 19, the refrigerator 1 further includes a first convex portion 37 and a second convex portion 38 that are disposed on the door body 30. The first convex portion 37 and the second convex portion 38 correspond to the second mounting block 72. For example, the first convex portion 37 and the second convex portion 38 are disposed at the lower end of the door body 30. The first convex portion 37 and the second convex portion 38 are disposed at an interval, so as to form a slot 39 between the first convex portion 37 and the second convex portion 38. A portion of the fixing portion 7211 may be inserted into the slot 39 as an inserting portion 7211A. In this way, the first convex portion 37 and the second convex portion 38 may limit the fixing portion 7211 in a length direction (e.g., the front-rear direction) of the door body 30, thereby avoiding the deformation of the fixing portion 7211 in the length direction of the door body 30.

It will be noted that the first mounting block 71 may further include the locking hook 721, and correspondingly, the hinge plate 40 located at the upper end of the door body 30 may further include the blocking portion 403. Moreover, the first convex portion 37 and the second convex portion 38 may also be disposed at the upper end of the door body 30, so as to correspond to the locking hook 721 of the first mounting block 71.

Figure 21:
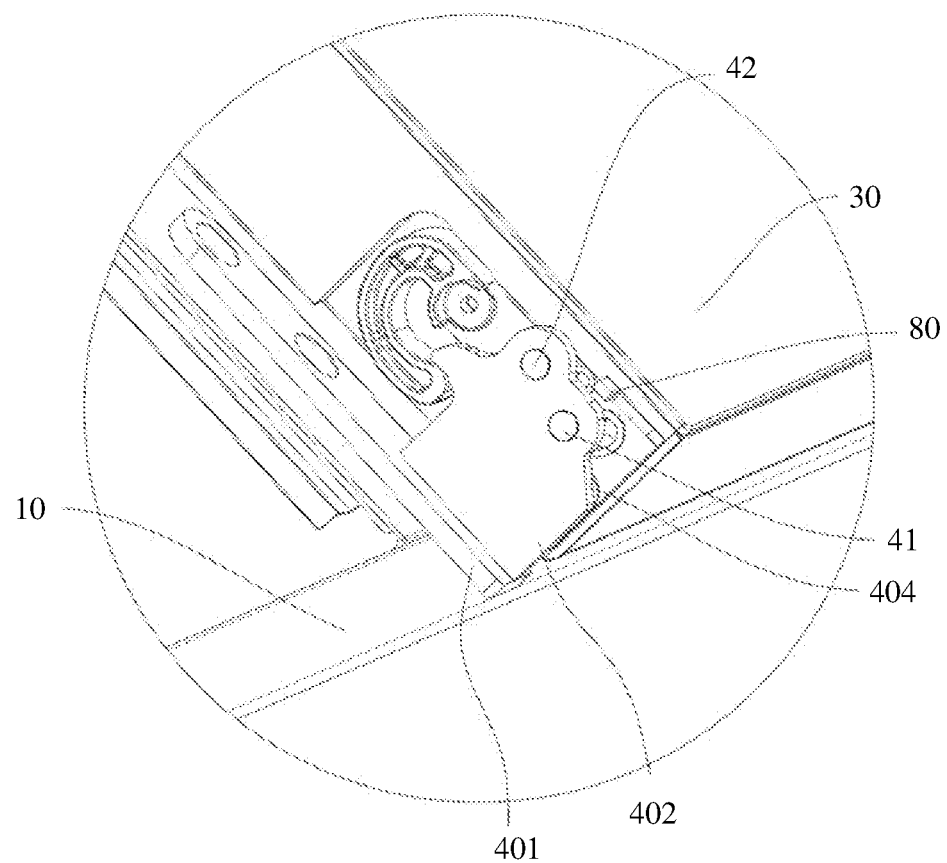
FIG. 21 is a diagram showing a structure of a hinge located at a lower end of a door body in a refrigerator, in accordance with some embodiments.

FIG. 21 is a diagram showing a structure of a hinge located at a lower end of a door body in a refrigerator, in accordance with some embodiments.

In some embodiments, the refrigerator 1 may further include a limiting structure. The limiting structure is disposed between the door body 30 and the hinge plate 40 and configured to limit the maximum opening angle of the door body 30, so as to avoid damaging the mounting block 70 when the door is opened to an angle with a great force.

For example, referring to FIGS. 19 and 21, the refrigerator 1 further includes a limiting block 80. The limiting block 80 is disposed at the lower end of the door body 30 and located at an end (e.g., a front end) of the second mounting block 72 away from the refrigerator body 10. In a case where the door body 30 rotates to a maximum allowable position, the limiting block 80 abuts against a side 404 of the hinge plate 40, thereby preventing the door body 30 from continuing to rotate.

In some embodiments, as shown in FIG. 19, the limiting block 80 is a sheet metal member and includes an embedded portion 81, a limiting portion 82, and a reinforcing portion 83.

The embedded portion 81 is in a shape of a plate and disposed in the second accommodating groove 36. The embedded portion 81 is located on a side (e.g., an upper side) of the plate body 711 of the second mounting block 72 proximate to the door body 30. In this way, the plate body 711 of the second mounting block 72 may clamp the embedded portion 81 on the door body 30 from the lower end of the door body 30, so as to fix the limiting block 80 on the door body 30.

The reinforcing portion 83 is connected to the embedded portion 81 and disposed perpendicularly to the embedded portion 81. For example, in a case where the limiting block 80 is installed, the embedded portion 81 extends in a horizontal direction (e.g., the left-right direction or the front-rear direction), and the reinforcing portion 83 extends in a vertical direction (e.g., the up-down direction). An end (e.g., a front end) of the embedded portion 81 away from the refrigerator body 10 is bent in a direction (e.g., downwards) away from the door body 30, so as to form the reinforcing portion 83.

The limiting portion 82 is in a shape of a block, and a portion of an end (e.g., a lower end) of the reinforcing portion 83 protrudes downwards, so as to form the limiting portion 82. The limiting portion 82 may extend beyond a lower surface of the door body 30 in the height direction, so that in a case where the door body 30 drives the limiting block 80 to rotate to the maximum opening angle, the limiting portion 82 is blocked by the side 404 of the hinge plate 40, so as to force the door body 30 to stop opening.

In some embodiments of the present disclosure, the limiting block 80 is clamped on the door body 30 by means of the second mounting block 72, so that the connection structure between the limiting block 80 and the door body 30 may be omitted and the structure of the refrigerator 1 may be simplified.

It will be noted that the limiting block 80 may also be disposed at the upper end of the door body 30, and details will not be repeated herein.

The above description is mainly given by considering an example in which the first trajectory slot 50 and the second trajectory slot 60 are disposed on the mounting block 70 and the mounting block 70 is installed on the door body 30. However, in some embodiments, the first trajectory slot 50 and the second trajectory slot 60 may also be directly disposed on the door body 30.

Figure 22:
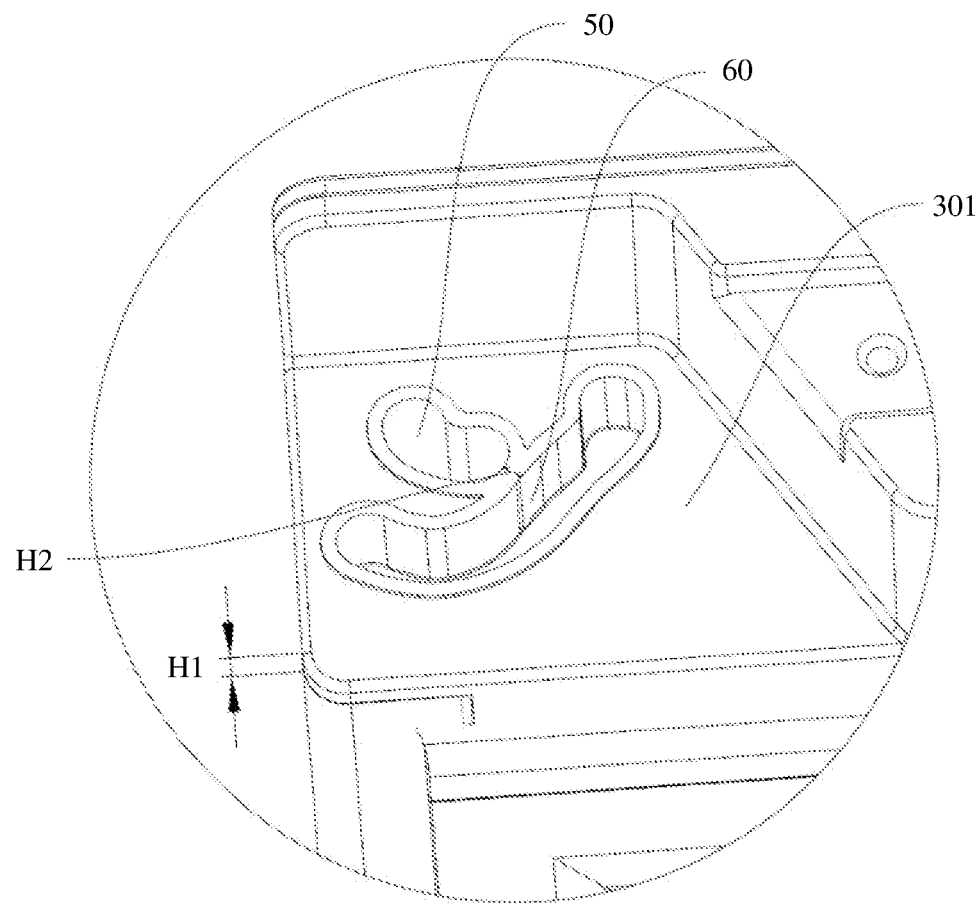
FIG. 22 is a diagram showing a structure of a door body in a refrigerator, in accordance with some embodiments.
Figure 23:
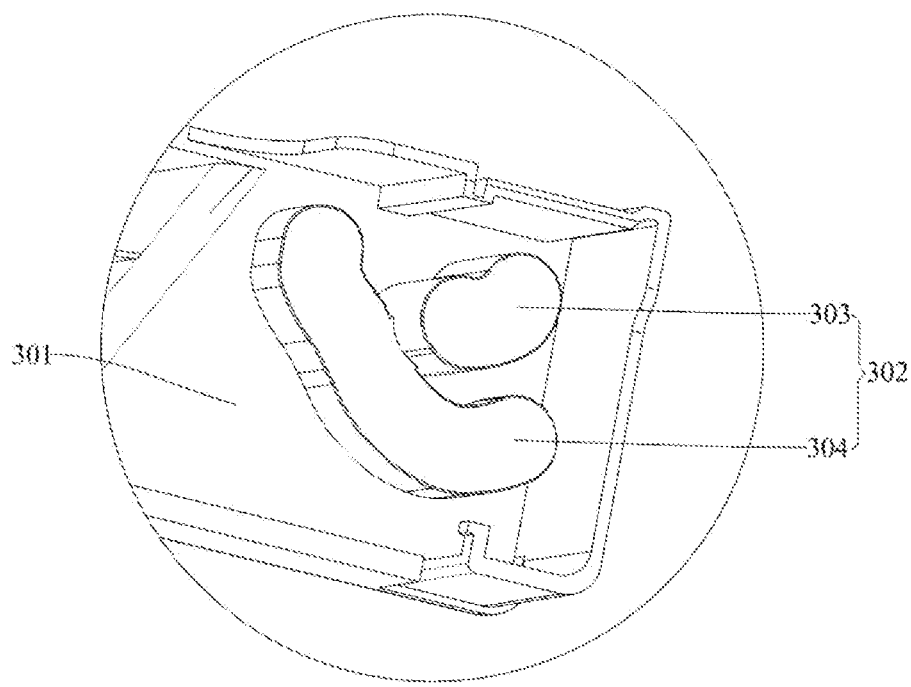
FIG. 23 is a diagram showing a structure of a door body in a refrigerator from another perspective, in accordance with some embodiments.

FIG. 22 is a diagram showing a structure of a door body in a refrigerator, in accordance with some embodiments. FIG. 23 is a diagram showing a structure of a door body in a refrigerator from another perspective, in accordance with some embodiments.

Referring to FIGS. 22 and 23, a position of the door body 30 corresponding to the hinge plate 40 located at the upper end of the door body 30 is recessed downwards, so as to form the first trajectory slot 50 and the second trajectory slot 60. A position of the door body 30 corresponding to the hinge plate 40 located at the lower end of the door body 30 is recessed upwards, so as to form the first trajectory slot 50 and the second trajectory slot 60.

For example, as shown in FIGS. 22 and 23, the door body 30 includes a door shell 301 and a protruding portion 302. The door shell 301 extends inward in a height direction of the door shell 301, so as to form the protruding portion 302. An outer surface of the door shell 301 is recessed inward onto the protruding portion 302, so as to form the first trajectory slot 50 and the second trajectory slot 60.

The protruding portion 302 and the door shell 301 may be a one-piece member. As shown in FIG. 23, the protruding portion 302 includes a first protruding portion 303 and a second protruding portion 304. A shape of the first protruding portion 303 is substantially the same as that of the first trajectory slot 50, and a shape of the second protruding portion 304 is substantially the same as that of the second trajectory slot 60.

As shown in FIG. 22, a minimum wall thickness H2 between the first trajectory slot 50 and the second trajectory slot 60 is 0.5 to 1 times a thickness H1 of the door shell 301 (i.e., $H2=(0.5 \text{ to } 1) \times H1$).

In this way, the distance between the first hinge shaft 41 and the second hinge shaft 42 is small, so that the movement of the hinge will be less affected while the strength of the door shell 301 will not be affected in a case where the door body 30 is slightly inclined or the two shafts are not parallel to each other.

It will be noted that the above description is mainly given by considering an example in which the first hinge shaft 41 and the second hinge shaft 42 are disposed on the hinge plate 40, and the first trajectory slot 50 and the second trajectory slot 60 are correspondingly disposed on the door body 30. However, in some other embodiments, the first hinge shaft 41 and the second hinge shaft 42 may also be disposed on the door body 30, and correspondingly, the first trajectory slot 50 and the second trajectory slot 60 may also be disposed on the hinge plate 40. Alternatively, the first hinge shaft 41 and the second trajectory slot 60 are disposed on the hinge plate 40, and the second hinge shaft 42 and the first trajectory slot 50 are disposed on the door body 30. Alternatively, the first hinge shaft 41 and the second trajectory slot 60 are disposed on the door body 30, and the second hinge shaft 42 and the first trajectory slot 50 are disposed on the hinge plate 40.

In some embodiments of the present disclosure, the door body 30 moves inwards for the fourth distance when the door body 30 is initially opened, which may avoid interference between the door body 30 and the cabinet 100. The door body 30 moves forwards for a distance when the door body 30 is initially opened, which may avoid friction and wear between the door seal 30A and the front surface of the refrigerator body 10.

Moreover, the process of the door body 30 rotating to be opened and moving inwards is divided into two stages (that is, the movement trajectories of the first hinge shaft 41 and the second hinge shaft 42 are straight lines in a case where the door body 30 is opened from the closed state to the first state, and the movement trajectories of the first hinge shaft 41 and the second hinge shaft 42 are curves in a case where the door body 30 continues to be opened from the first state to the second state). In this way, from the first state along the straight lines to the second state along the curves, it is possible to avoid the problem that the door body 30 shakes due to the trajectories being close to parallelism in a case where the door body 30 rotates at a large angle along a straight line or a curve. Moreover, the first hinge shaft 41 and the second hinge shaft 42 each only perform a linear movement of a small distance at the beginning, and then perform a curve movement of a large angle. The curve movement may improve the smoothness of the movement of the door body 30 and prevent the user from feeling discontinuity due to the door body 30 moving inwards discontinuously when the door body 30 moves in a straight line.

In addition, during a process of opening the door body 30 from the first state to the second state, the curve movement trajectories of the first hinge shaft 41 and the second hinge shaft 42 each include at least two curve segments with decreasing curvature, so that the door body 30 moves a small distance inwards when rotating at the unit angle. In this way, the movement of the door body 30 slows down during a process of the door body 30 rotating to be opened and moving inwards, so as to improve continuity of the door body 30 during movement.

In a case where the door body 30 continues to be opened from the state with the 90° opening angle, the movement trajectory of the first hinge shaft 41 is the fourth curve 534, and the movement trajectory of the second hinge shaft 42 is the fifth curve 645, so that there is an included angle between tangents of the movement trajectories of the first hinge shaft 41 and the second hinge shaft 42 at any group of corresponding points, which avoids the problem that the door body 30 is prone to shaking when rotating within a large angle range, and improves the stationarity of the movement of the door body 30.

During the entire process of opening the door body 30, the first hinge shaft 41 moves from one end of the first trajectory slot 50 to another end of the first trajectory slot 50, and the second hinge shaft 42 moves from one end of the second trajectory slot 60 to another end of the second trajectory slot 60, and the movement process will not retract, which improves continuity when the door body 30 is opened.

In the above description of the embodiments, specific features, structures, materials, or characteristics may be combined in a suitable manner in any one or more embodiments or examples.

A person skilled in the art will understand that the scope of disclosure in the present disclosure is not limited to specific embodiments discussed above and may modify and substitute some elements of the embodiments without departing from the spirits of the present disclosure. The scope of the present disclosure is limited by the appended claims.

What is claimed is:

1. A refrigerator, comprising:
a refrigerator body; and
a door body rotatably connected to the refrigerator body, the door body being rotatably supported by a hinge located at an upper end of the door body and a hinge located at a lower end of the door body, each of the upper and lower ends of the door body being provided with a first trajectory slot and a second trajectory slot, wherein each of the hinge located at the upper end of the door body and the hinge located at the lower end of the door body includes a hinge plate connected to the refrigerator body, and a first hinge shaft and a second hinge shaft that are connected to the hinge plate to constitute rotation shafts; and the first hinge shaft is matched with the first trajectory slot, and the second hinge shaft is matched with the second trajectory slot;

a hinge plate of the hinge located at the upper end of the door body is connected to an upper end of the refrigerator body, and a hinge plate of the hinge located at the lower end of the door body is connected to a lower end of the refrigerator body; and the door body includes a front wall and a side wall, and for each of the hinge located at the upper end of the door body and the hinge located at the lower end of the door body, the side wall is a side of a left side and a right side of the door body proximate to the hinge plate, wherein in a case where the hinge plate is located on a right side of the refrigerator body, the right side of the door body is the side wall; or in a case where the hinge plate is located on a left side of the refrigerator body, the left side of the door body is the side wall;

wherein for each of the hinge located at the upper end of the door body and the hinge located at the lower end of the door body, in a case where the door body is in a closed state,
the first hinge shaft is closer to the side wall and farther away from the front wall than the second hinge shaft; and the first trajectory slot has a first positioning position and a second positioning position, a movement trajectory of the first hinge shaft in the first trajectory slot from the first positioning position to the second positioning position is a first positioning trajectory line; correspondingly, the second trajectory slot has a first guiding position and a second guiding position, a movement trajectory of the second hinge shaft in the second trajectory slot from the first guiding position to the second guiding position is a first guiding trajectory line;

in a case where the door body is opened from the closed state to a first state,
the first hinge shaft moves from the first positioning position to the second positioning position along the first positioning trajectory line with respect to the first trajectory slot; meanwhile, the second hinge shaft moves from the first guiding position to the second guiding position along the first guiding trajectory line with respect to the second trajectory slot;

the second positioning position is farther away from the front wall and closer to the side wall than the first positioning position, and the first positioning trajectory line extends in a direction away from the front wall and proximate to the side wall; the second guiding position is farther away from the front wall and closer to the side wall than the first guiding position, and the first guiding trajectory line extends in a direction away from the front wall and proximate to the side wall; and the first trajectory slot further has a third positioning position, a movement trajectory of the first hinge shaft in the first trajectory slot from the second positioning position to the third positioning position is a second positioning trajectory line; correspondingly, the second trajectory slot further has a third guiding position, a movement trajectory of the second hinge shaft in the second trajectory slot from the second guiding position to the third guiding position is a second guiding trajectory line;

in a case where the door body continues to be opened from the first state to a second state,
the first hinge shaft moves from the second positioning position to the third positioning position along the second positioning trajectory line with respect to the first trajectory slot, and the second hinge shaft moves from the second guiding position to the third guiding position along the second guiding trajectory line with respect to the second trajectory slot;

the third positioning position is closer to the front wall and the side wall than the second positioning position, and the second positioning trajectory line extends from the second positioning position to the third positioning position in a direction proximate to the front wall and the side wall; the third guiding position is farther away from the front wall and closer to the side wall than the second guiding position, and the second guiding trajectory line extends in a direction away from the front wall and proximate to the side wall; and an opening angle of the door body in the second state is less than 90°; and in a case where the door body continues to be opened from the second state to a state with a 90° opening angle, a position of the first hinge shaft remains unchanged in the first trajectory slot, the door body rotates with the first hinge shaft as a center of a circle, and the second hinge shaft moves to a fourth guiding position along a third guiding trajectory line in the second trajectory slot; the third guiding trajectory line is in a shape of an arc, and the fourth guiding position is farther from the front wall and closer to the side wall than the third guiding position.

2. The refrigerator according to claim 1, wherein in a case where the door body is in the closed state, a first distance between the first hinge shaft and the second hinge shaft in a front-rear direction is greater than or equal to 2.5 mm and less than or equal to 10 mm, and a second distance between the first hinge shaft and the second hinge shaft in a left-right direction is greater than or equal to 7.5 mm and less than or equal to 30 mm.

3. The refrigerator according to claim 1, wherein a thickness of the door body is within a range of 44 mm to 53 mm, inclusive, a corner of the door body extends beyond a side of the refrigerator body by a distance less than 3 mm during a process of opening the door body.

4. The refrigerator according to claim 1, wherein in a case where the door body is in the closed state, the first hinge shaft is located at an end portion of the first trajectory slot, and the second hinge shaft is located at an end portion of the second trajectory slot.

5. The refrigerator according to claim 4, wherein in a case where the door body is in the closed state, the second hinge shaft has a gap with an end wall of the second trajectory slot.

6. The refrigerator according to claim 1, wherein the refrigerator satisfies at least one of following:

the first positioning trajectory line and the first guiding trajectory line are curves;

the second positioning trajectory line and the second guiding trajectory line are curves;

a distance from the second positioning position to the third positioning position is greater than a distance from the first positioning position to the second positioning position;

a length of the first hinge shaft is greater than a length of the second hinge shaft; and the first hinge shaft moves from an end of the first trajectory slot to another end of the first trajectory slot and the second hinge shaft moves from an end of the second trajectory slot to another end of the second trajectory slot during an entire process of opening the door body.

7. The refrigerator according to claim 1, wherein the second positioning trajectory line is a first curve, and the second guiding trajectory line is a second curve, the first curve and the second curve each include at least two curve segments, curvatures of the at least two curve segments in any one of the first curve and the second curve decrease sequentially.

8. The refrigerator according to claim 7, wherein the first curve includes a first curve segment and a third curve segment connected in sequence, and the second curve includes a second curve segment and a fourth curve segment connected in sequence; a curvature of the third curve segment is less than a curvature of the first curve segment, and a curvature of the fourth curve segment is less than a curvature of the second curve segment.

9. The refrigerator according to claim 1, further comprising mounting blocks, each mounting block of the mounting blocks being installed at a position of the door body corresponding to the hinge plate, and the first trajectory slot and the second trajectory slot being disposed on the mounting block.

10. The refrigerator according to claim 9, wherein the mounting blocks include a first mounting block disposed at the upper end of the door body and a second mounting block disposed at the lower end of the door body.

11. The refrigerator according to claim 10, wherein the first mounting block includes a plate body, and a second extending portion constituted by a lower surface of the plate body extending downwards; an upper surface of the plate body is recessed downwards onto the second extending portion, so as to constitute a first trajectory slot and a second trajectory slot at the upper end of the door body.

12. The refrigerator according to claim 10, wherein in the first mounting block, a first trajectory slot at the upper end of the door body is deeper than a second trajectory slot at the upper end of the door body.

13. The refrigerator according to claim 10, wherein the refrigerator satisfies at least one of following:

a first accommodating groove is correspondingly disposed at the upper end of the door body, and the first mounting block is inserted into the first accommodating groove; and a second accommodating groove is correspondingly disposed at the lower end of the door body, and the second mounting block is inserted into the second accommodating groove.

14. The refrigerator according to claim 10, wherein the second mounting block includes a plate body and a second extending portion, an upper surface of the plate body extends upwards to constitute the second extending portion of the second mounting block, and a lower surface of the plate body is recessed upwards onto the second extending portion, so as to constitute a first trajectory slot and a second trajectory slot at the lower end of the door body.

15. The refrigerator according to claim 10, wherein the second mounting block includes a plate body, a second extending portion, and a locking hook disposed on an inner side of the plate body; the locking hook extends toward the inner side of the plate body and is bent towards a rear side of the door body, an opening of the locking hook faces the plate body, and a free end of the locking hook is located on the rear side of the door body;

the hinge plate of the hinge located at the lower end of the door body includes a blocking portion, the blocking portion is disposed on an inner side of the hinge plate of the hinge located at the lower end of the door body and extends outwards;

in a case where the door body is in the closed state, the locking hook on the door body hooks the blocking portion of the hinge plate of the hinge located at the lower end of the door body, so as to lock the door body; and in a case where the door body is opened, the locking hook is deformed due to force and overcomes obstruction of the blocking portion, so as to be detached from the blocking portion.

16. The refrigerator according to claim 15, wherein the locking hook includes a fixing portion and a hook portion, the fixing portion is connected to the plate body, and the hook portion is connected to the fixing portion and bent backward, a screw passes through the fixing portion and is connect with the door body.

17. The refrigerator according to claim 16, wherein the refrigerator satisfies at least one of following:
the free end of the hook portion and a free end of the blocking portion are each in a shape of an arc; and
the refrigerator further comprises a first convex portion and a second convex portion that are disposed on the door body, the first convex portion and the second convex portion are arranged substantially in a front-rear direction, and a portion of the fixing portion is located between the first convex portion and the second convex portion.

18. The refrigerator according to claim 10, further comprising a limiting block, the limiting block being disposed at the lower end of the door body, and the limiting block being clamped on the door body by the second mounting block;
wherein in a case where the door body rotates to a maximum allowable position, the limiting block abuts against a side of the hinge plate of the hinge located at the lower end of the door body, so as to prevent the door body from continuing to rotate.

19. The refrigerator according to claim 1, wherein for each of the hinge located at the upper end of the door body and the hinge located at the lower end of the door body, the hinge plate includes:
a connecting portion connected to the refrigerator body; and
a first extending portion extending forward from the connecting portion and in a shape of a plate extending horizontally;
wherein a first hinge shaft and a second hinge shaft of the hinge located at the upper end of the door body are disposed on the first extending portion in the hinge plate of the hinge located at the upper end of the door body and extend vertically downwards; and
a first hinge shaft and a second hinge shaft of the hinge located at the lower end of the door body are disposed on the first extending portion in the hinge plate of the hinge located at the lower end of the door body and extend vertically upwards.

20. The refrigerator according to claim 19, wherein a connecting portion in the hinge plate of the hinge located at the lower end of the door body is in a shape of a plate and connected to a front surface of the refrigerator body.

* * * * *